United States Patent
Gostylla et al.

(10) Patent No.: US 10,751,789 B2
(45) Date of Patent: Aug. 25, 2020

(54) LINEAR ACTUATOR ASSEMBLY

(71) Applicant: Henrob Limited, Flintshire (GB)

(72) Inventors: Wojciech Gostylla, Queensland (AU); Stuart Edmund Blacket, Queensland (AU); Shane Bathurst, Chester (GB)

(73) Assignee: ATLAS COPCO IAS UK LIMITED, Flintshire (GB)

( * ) Notice: Subject to any disclaimer, the term of this patent is extended or adjusted under 35 U.S.C. 154(b) by 598 days.

(21) Appl. No.: 15/110,913

(22) PCT Filed: Jan. 16, 2015

(86) PCT No.: PCT/GB2015/050084
§ 371 (c)(1),
(2) Date: Jul. 11, 2016

(87) PCT Pub. No.: WO2015/107352
PCT Pub. Date: Jul. 23, 2015

(65) Prior Publication Data
US 2016/0325342 A1    Nov. 10, 2016

(30) Foreign Application Priority Data

Jan. 16, 2014 (GB) .................................. 1400725.6
Jan. 16, 2014 (GB) .................................. 1400734.8
(Continued)

(51) Int. Cl.
*B21J 15/26*    (2006.01)
*B21J 15/10*    (2006.01)
(Continued)

(52) U.S. Cl.
CPC .............. *B21J 15/26* (2013.01); *B21D 39/03* (2013.01); *B21J 15/025* (2013.01); *B21J 15/027* (2013.01);
(Continued)

(58) Field of Classification Search
CPC .......... B21J 15/26; B21J 15/025; B21J 15/10; F16H 25/2025; B23P 19/062; Y10T 29/4984; Y10T 29/5343
See application file for complete search history.

(56) References Cited

U.S. PATENT DOCUMENTS 1,404,126 A    1/1922    Krause
2,743,623 A    5/1956    Wells
(Continued)

FOREIGN PATENT DOCUMENTS

CN    1 078 672 A    11/1993
CN    1232736 A    10/1999
(Continued)

OTHER PUBLICATIONS

Japanese Office action (with English Summary) dated Dec. 4, 2018, for Japanese application JP 2016-564426, Applicant, Henrob Limited (8 pages).
(Continued)

*Primary Examiner* — Jermie E Cozart
(74) *Attorney, Agent, or Firm* — McCracken & Gillen LLC

(57) ABSTRACT

A linear actuator assembly comprises a linear actuator which has a housing and an output shaft, the output shaft defining an actuator axis and being movable along the actuator axis between an extended position and a retracted position. The assembly also comprises a buffer carriage arranged in an active configuration in which it is mounted on either the housing or the output shaft. The buffer carriage has a rotary portion which is rotationally coupled to the output shaft such that rotation of the output shaft about the actuator axis requires corresponding rotation of the rotary portion. The rotary portion is rotationally restrained when the buffer carriage is in the active configuration.

21 Claims, 23 Drawing Sheets

(30) Foreign Application Priority Data

Jan. 16, 2014 (GB) .................................. 1400736.3
Jan. 16, 2014 (GB) .................................. 1400761.1

(51) Int. Cl.

| | | |
|---|---|---|
| B23K 20/12 | (2006.01) | |
| B21D 39/03 | (2006.01) | |
| B23K 26/352 | (2014.01) | |
| B23K 20/227 | (2006.01) | |
| B23K 20/233 | (2006.01) | |
| B23K 20/24 | (2006.01) | |
| F16H 25/20 | (2006.01) | |
| B23P 19/06 | (2006.01) | |
| B21J 15/02 | (2006.01) | |
| H02K 41/02 | (2006.01) | |
| F16B 5/08 | (2006.01) | |
| B23K 101/00 | (2006.01) | |
| B23K 103/08 | (2006.01) | |
| B23K 103/18 | (2006.01) | |
| B23K 103/10 | (2006.01) | |
| B23K 103/16 | (2006.01) | |
| B23K 103/20 | (2006.01) | |
| B23K 103/00 | (2006.01) | |
| B23K 103/04 | (2006.01) | |
| B23K 103/24 | (2006.01) | |
| B23K 103/14 | (2006.01) | |

(52) U.S. Cl.
CPC ............ *B21J 15/10* (2013.01); *B23K 20/127* (2013.01); *B23K 20/1265* (2013.01); *B23K 20/227* (2013.01); *B23K 20/2333* (2013.01); *B23K 20/24* (2013.01); *B23K 26/352* (2015.10); *B23P 19/062* (2013.01); *F16B 5/08* (2013.01); *F16H 25/2025* (2013.01); *H02K 41/02* (2013.01); *B23K 2101/006* (2018.08); *B23K 2103/04* (2018.08); *B23K 2103/05* (2018.08); *B23K 2103/10* (2018.08); *B23K 2103/14* (2018.08); *B23K 2103/15* (2018.08); *B23K 2103/16* (2018.08); *B23K 2103/172* (2018.08); *B23K 2103/18* (2018.08); *B23K 2103/20* (2018.08); *B23K 2103/24* (2018.08); *B23K 2103/34* (2018.08); *B23K 2103/42* (2018.08); *Y10T 29/4984* (2015.01)

(56) References Cited

U.S. PATENT DOCUMENTS

| | | |
|---|---|---|
| 3,127,044 A | 3/1964 | Brown |
| 4,756,072 A | 7/1988 | Falzoni |
| 5,183,357 A | 2/1993 | Palm |
| 5,256,017 A | 10/1993 | Smornov et al. |
| 5,315,744 A | 5/1994 | Denham et al. |
| 6,234,034 B1 | 5/2001 | Ando |
| 6,676,000 B2 | 1/2004 | Lang et al. |
| 7,032,296 B2 | 4/2006 | Zdravkovic et al. |
| 7,559,133 B2 | 7/2009 | Chitty et al. |
| 7,908,727 B2 | 3/2011 | Clew |
| 2002/0125297 A1 | 9/2002 | Stol et al. |
| 2002/0166221 A1 | 11/2002 | Clew |
| 2003/0029903 A1 | 2/2003 | Kashiki et al. |
| 2003/0051332 A1 | 3/2003 | Meichsner et al. |
| 2004/0118900 A1 | 6/2004 | Stevenson et al. |
| 2008/0056842 A1 | 3/2008 | Stevenson et al. |
| 2008/0093420 A1 | 4/2008 | Maurer |
| 2008/0276444 A1 | 11/2008 | Condliff |
| 2008/0289442 A1 | 11/2008 | Kawada et al. |
| 2009/0247365 A1 | 10/2009 | Di Stefano et al. |
| 2011/0164945 A1 | 7/2011 | Lathabai et al. |
| 2011/0304231 A1 | 12/2011 | Wu |
| 2014/0041193 A1 | 2/2014 | Schlafhauser |
| 2014/0245848 A1 | 9/2014 | Ikeda |
| 2014/0265547 A1 | 9/2014 | Ganzel |
| 2014/0298934 A1 | 10/2014 | Marek et al. |

FOREIGN PATENT DOCUMENTS

| | | |
|---|---|---|
| CN | 101433935 | 5/2009 |
| CN | 201246383 Y | 5/2009 |
| CN | 101451599 A | 6/2009 |
| CN | 101468421 A | 7/2009 |
| CN | 101537252 A | 9/2009 |
| CN | 101817142 A | 9/2010 |
| CN | 102 686 329 A | 9/2012 |
| CN | 202481711 U | 10/2012 |
| CN | 103228375 A | 7/2013 |
| CN | 103 260 790 A | 8/2013 |
| CN | 103240564 A | 8/2013 |
| CN | 203253869 U | 10/2013 |
| CN | 103990756 A | 8/2014 |
| CN | 204220914 | 3/2015 |
| CN | 101829903 A | 9/2019 |
| DE | 19743277 A1 | 5/1999 |
| DE | 10 2004 015 568 A1 | 10/2005 |
| DE | 102004053224 | 5/2006 |
| DE | 102010046318 A1 | 3/2012 |
| FR | 993420 A | 10/1951 |
| JP | S59 4981 A | 1/1984 |
| JP | H 01254342 A | 10/1989 |
| JP | H02229639 A | 9/1990 |
| JP | 2002-174219 | 6/2002 |
| JP | 2002/174219 A | 6/2002 |
| JP | 3349098 | 11/2002 |
| JP | 2002-364617 | 12/2002 |
| JP | 2005291382 A | 10/2005 |
| JP | 2006/043769 A | 2/2006 |
| JP | 2007/520358 A | 7/2007 |
| JP | 4 517 362 B2 | 8/2010 |
| JP | 5055104 | 10/2012 |
| JP | 2013148122 | 8/2013 |
| KR | 10 1995 7002 507 A | 11/1995 |
| KR | 10-2004-0090612 | 10/2004 |
| KR | 1020040090612 A | 10/2004 |
| KR | 10-2011-0036624 | 4/2011 |
| KR | 10-2011-0131826 | 12/2011 |
| KR | 10-2013-0070362 | 6/2013 |
| KR | 10-2013-0134180 | 12/2013 |
| KR | 10-2013-0140711 | 12/2013 |
| WO | WO 94/14554 | 7/1994 |
| WO | WO 94/14554 A1 | 7/1994 |
| WO | WO 2009/137868 | 11/2009 |

OTHER PUBLICATIONS

Japanese Office action (English Summary) dated Nov. 13, 2018, for Japanese Patent Application No. JP 2016-564424: Applicant, Henrob Limited (8 pages).

Japanese Office action (English Summary) dated Jan. 15, 2019, for Japanese Patent Application No. JP 2016-564423: Applicant, Henrob Limited (5 pages).

English Translation of Korean Notice of Office Action dated Jul. 10, 2017, for KR Application No. 10-2016-7021078, Applicant Henrob Ltd. (5 pages).

English Translation of Korean Notice of Office Action dated Jul. 18, 2017, for KR Application No. 10-2016-7021130, Applicant Henrob Ltd. (3 pages).

English Translation of Korean Notice of Office Action dated Jul. 18, 2017, for KR Application No. 10-2016-7021353, Applicant Henrob Ltd. (15 pages).

Chinese Second Office action with English Summary dated Aug. 31, 2018, for Chinese Patent Application No. 201580013385.8, Applicant, Henrob Limited (26 pages).

Japanese Office action English Summary dated Oct. 2, 2018, for Japanese Patent Application No. JP 2016-564425, Applicant, Henrob Limited (1 page).

Chinese First Office Action with English Summary dated Apr. 3,

(56) References Cited

OTHER PUBLICATIONS 2018, for Chinese Patent Application No. 2015800047956, Applicant, Henrob Limited (8 pages).
Lathabai, S., et al., Friction spot joining of an extruded Al—Mg—Si alloy, Science Direct (online), Aug. 22, 2006, pp. 899-902, Scripta Materialia 55 (2006) (4 Pages).
International Search Report and Written Opinion dated Apr. 20, 2015, for International Application No. PCT/GB2015/050084, Applicant, Henrob Limited (11 Pages).
Invitation to Pay Additional Fees dated Apr. 8, 2015, for International Application No. PCT/GB2015/050085, Applicant, Henrob Limited (6 Pages).
International Search Report dated Jun. 9, 2015, for International Application No. PCT/GB2015/050085, Applicant, Henrob Limited (4 Pages).
First Office Action dated Sep. 29, 2017, for Chinese Appl. No. 201580004824.9, and English Translation (8 pages).
First Office Action dated Oct. 30, 2017, for Chinese Appl. No. 201580013385.8, and English Summary (21 pages).
First Office Action dated Dec. 4, 2017, for Chinese Appl. No. 2015800049330, and English summary (7 pages).
Chinese second office action (with English Translation) dated Feb. 19, 2019, for Chinese application CN201580004795.6, applicant, Henrob Limited (10 pages).
International Search Report (with English summary) dated Jun. 13, 2005, accompanying JP2007/520358A, applicant, Newfrey LLC (6 pages).
Solomon, EIC 3600 Search Report, Scientific & Technical Information Center, dated Jun. 14, 2019 (28 pages), United States.
U.S. Patent and Trademark Office Non-final Office action, U.S. Appl. No. 15/110,919, dated Jun. 21, 2019 (23 pages).
Final Office Action in connection with U.S. Appl. No. 15/110,919 dated Feb. 3, 2020 (10 pages).
Communication related to European Patent Application No. 15701570.2, dated Sep. 9, 2019, Applicant, Atlas Copco IAS UK Limited (9 pages)).
Third Office Action issued in connection with Chinese Application No. 201580013385.8, dated Dec. 3, 2019, and summarized translation (27 pages).

LINEAR ACTUATOR ASSEMBLY

CROSS-REFERENCE TO RELATED APPLICATIONS

This Application is a national stage application, filed under 35 U.SC. § 371, of International Application No. PCT/GB2015/050084, filed Jan. 16, 2015, which claims priority to GB1400725.6, filed Jan. 16, 2014, GB1400736.3, filed Jan. 16, 2014, GB1400761.1, filed Jan. 16, 2014, and GB1400734.8, filed Jan. 16, 2014, all of which are incorporated by reference herein in their entireties.

FIELD OF DISCLOSURE

The present invention relates to a linear actuator assembly.

BACKGROUND

Self-piercing riveting (SPR) is a spot-joining technique in which a self-piercing rivet is driven, by a punch, into a layered workpiece supported on a die. The die is shaped so that as the rivet is driven into the workpiece towards the die, the material of the workpiece plastically deforms. This flow of workpiece material causes the annular tip of the rivet to flare outwards and remain encapsulated by an upset annulus of the workpiece material. The flared tip of the rivet interlocking with the upset annulus of the workpiece prevents removal of the rivet or separation of the layers of the workpiece.

Insertion of the rivet into the workpiece is performed using a linear actuator, which drives the punch and rivet towards a stationary workpiece and die, or drives the die and workpiece towards a stationary rivet and punch (the former arrangement being more common). Linear actuators of many different types may be used for SPR, but the most common types are hydraulic cylinders, or motor-driven electrical actuators. Motor-driven electrical actuators, unlike electrical actuators such as solenoids, utilise a conventional rotary electric motor. The motor operates a ball screw, lead screw or roller screw mechanism so as to produce linear movement of an actuator output shaft. These three mechanisms all follow the same basic format—the motor rotates a first threaded member which is meshed (directly or indirectly) with a second threaded member connected to the output shaft. If the first and second threaded members rotate in unison, no linear motion is produced. If the first threaded member rotates relative to the second, however, (for instance if the second threaded member is prevented from rotating), rotation of the first threaded member will be translated into linear motion of the second threaded member.

As an example, a lead screw mechanism comprises an externally-threaded screw shaft meshed directly with an internally-threaded nut. If the screw shaft is connected to a motor and the nut to an output shaft, the screw shaft constitutes the first threaded member and the nut the second threaded member. By rotating the screw shaft using the motor, the nut moves along the screw shaft and the output shaft moves linearly. Similarly, if the nut is connected to the motor and the screw shaft to the output shaft, the nut constitutes the first threaded member and the screw shaft the second threaded member. By rotating the nut, the screw shaft moves axially within the nut and the output shaft is extended or retracted linearly. The above also holds in relation to ball screw mechanisms, except that the nut and screw shaft are not meshed directly. Instead, they are meshed indirectly via a set of ball bearings disposed therebetween. Similarly, roller screw mechanisms follow the above principle but the screw shaft and nut are meshed indirectly through a set of threaded roller.

In many applications for linear actuators, such as SPR, it is desirable to limit the stroke length of a linear actuator (i.e. limit the freedom of movement of the actuator's output shaft). In machines where the movement of the actuator output shaft is controlled solely by a control algorithm, there may be potential for a fault in the system to allow overtravel of the output shaft, with potentially severe consequences. For instance, in an SPR tool where the electrical actuator drives the punch, an interruption in the power supply to the tool may prevent the control unit from sending a timely 'stop' signal to the actuator. As a result, the actuator may drive the punch beyond its intended final position and into the workpiece itself, spoiling the workpiece.

It is known to use stop surfaces positioned in the path of the output shaft of an actuator so as to prevent overtravel. Although such surfaces can be effective in stopping the movement of an actuator output shaft, impact of the shaft against a stop surface can cause significant damage to the actuator. For instance, impact against stop surfaces can cause the output shaft of an actuator to deform, bringing it out of acceptable dimensional tolerances. The problem of collision with stop surfaces can be particularly severe in applications which utilise not only the force from the actuator, but also the kinetic energy of components moved within the actuator (for example in some SPR tools the rivet insertion force is provided partially by the rotational inertia of a flywheel generating linear movement of the punch). Such applications necessarily utilise relatively heavy components moving at relatively high speeds, and so the damage caused by a collision with a stop surface may be particularly severe.

So as to limit the damage brought about by collision of an actuator output shaft with a stop surface, some actuators utilise elastomeric crash pads positioned over the stop surfaces. During a collision, the crash pads elastically deform and help to dissipate the energy of the collision, reducing the force applied to the components at risk of damage. However, such crash pads can be prone to wear and/or degradation, releasing small particles which can migrate within the tool and cause damage. For example, they can abrade the seals of hydraulic or pneumatic cylinders, or obstruct proper function of threaded components in motor-driven linear actuators. In addition, once a crash pad has been deformed to a certain extent during a collision, it will be incapable of absorbing any further energy. At this point, the actuator output shaft will still experience a 'hard stop', and damage may still occur. Replacement of crash pads necessitates opening up the internal workings of an actuator An additional risk of damage occurring is present if the actuator continues to urge the output shaft to move when the shaft is at the end of its travel. For instance, in an SPR tool which utilises an electric lead screw actuator to drive the punch, rotational inertia in the components of the lead screw mechanism may continue to apply force (axial and/or torsional) to the punch during a collision with a stop surface, after it has reached the 'hard stop' of a crash pad. This may bring about excessive loading in the threads of the lead screw due to high torques from sudden deceleration, damaging the threaded components. These are often particularly costly components because they are manufactured to precise tolerances out of very hard material.

A solution to the specific problem of excess loading in the threads of a motor-driven electrical actuator has been proposed in the form of a frangible key assembly mounted to the tip of the actuator output shaft. An actuator with frangible key assembly also has an anti-rotation tube which is fixed to its housing and projects in the direction of movement of the actuator output shaft. The key assembly has a pair of keys projecting from a central hub into corresponding keyways in the anti-rotation tube. The keys are each connected to the hub by a shear pin. In normal use the keys of the key assembly being received within keyways in the anti-rotation tube prevents the key assembly, and thus the output shaft, from rotating. As outlined above, this brings about linear movement of the output shaft. As the output shaft moves, the key assembly moves with it and the keys run along the keyways. If the output shaft is subjected to excessive resistance to motion, however, the force urging the second threaded member to rotate with the first is increased. The key assembly is therefore subjected to increased torsional loading and the shear pins holding the keys in place are fractured. At this point the key assembly (minus the keys) is able to rotate within the anti rotation-tube, and so the output shaft is able to rotate and no further linear movement (and damage therefrom) takes place.

One problem with the above solution is that it requires extremely tight tolerances in relation to the dimensions and hardness of the shear pins. Since in normal use the first threaded member exerts a significant force on the second threaded member, urging it to rotate, the shear pins must be of sufficient size and strength to withstand this loading without fracturing or experiencing fatigue. At the same time, the pins must be small and soft enough that they will reliably fracture before the loading in the threads of the actuators can increase enough for damage to the threaded members to result. By way of an example, in one particular actuator the working torque applied to output shaft, which must be withstood by the shear pins, is 80 Nm. The threaded members of this actuator are able to withstand up to 140 Nm of torque, or 140 kN of axial force, before damage occurs. The pins must therefore reliably fracture when less than 140 Nm of torque is applied to the output shaft, but must withstand 80 Nm of torque without any risk of fatigue. The shear plane of the pins is 2 cm radially outwards, therefore the pins must reliably fracture under a shear load of 7 kN but withstand a shear load of 4 kN without any risk of fatigue. This 3 kN range, within which the pins must transition from completely unaffected to absolute failure, equates to a very tight operating window.

SUMMARY

It is one object of the present invention to mitigate or obviate one of the aforesaid disadvantages, and/or to provide an improved or alternative linear actuator assembly, stroke-limiting assembly or buffer carriage.

According to a first aspect of the present invention there is provided a linear actuator assembly comprising:
a linear actuator which has a housing and an output shaft, the output shaft defining an actuator axis and being movable along the actuator axis between an extended position and a retracted position relative to the housing; and
a buffer carriage arranged in an active configuration in which it is mounted on either the housing or the output shaft, the buffer carriage having a rotary portion, wherein:
the output shaft is rotationally coupled to the rotary portion of the buffer carriage such that rotation of the output shaft about the actuator axis requires corresponding rotation of the rotary portion;
the rotary portion is rotationally restrained when the buffer carriage is in the active configuration;
the one of the housing and output shaft on which the buffer carriage is not mounted has a first abutment surface;
the first abutment surface is positioned to act directly or indirectly on the buffer carriage when the output shaft reaches one of the extended position and the retracted position, such that continued movement of the output shaft beyond said position moves the buffer carriage from the active configuration towards a first passive configuration; and
the rotary portion is rotatable about the actuator axis when the buffer carriage is in the first passive configuration.

The use of an abutment surface moving the buffer carriage to a passive configuration may provide advantageously increased control over when the output shaft is permitted to rotate. This, in turn, may allow the point at which the output shaft can rotate to be more accurately controlled. For instance, an actuator according to the first aspect of the invention can provide a much wider operating window in comparison to the above arrangement, as explained below.

In a preferred embodiment, when it is rotationally restrained the rotary portion is substantially rotationally static.

The first abutment surface may be configured to contact the buffer carriage when the output shaft is in the extended position. Alternatively, the abutment surface may be configured to contact the buffer carriage when the output shaft is in the retracted position.

The buffer carriage may be mounted on the housing, with the abutment surface provided on the output shaft. However, in other embodiments the buffer carriage may be mounted on the output shaft and the abutment surface may be provided on the housing.

For the avoidance of doubt, the entire buffer carriage may constitute the rotary 'portion'.

The buffer carriage may remain mounted on said one of the housing and output shaft when in it is in the first passive configuration.

The first abutment surface may be a surface provided on the housing or output shaft, or may be provided on a component mounted thereto.

The output shaft and the rotary portion may be rotationally coupled through a key and keyway. Alternatively, they may be rotationally coupled through any other suitable mechanism. For instance, the output shaft may have a polygonal cross-section and the rotary portion a complementary polygonal bore.

In one embodiment of the first aspect of the invention:
the one of the housing and output shaft on which the buffer carriage is not mounted has a second abutment surface; and
the second abutment surface is positioned to act directly or indirectly on the buffer carriage when the output shaft reaches the other one of the extended position and the retracted position to the position in which the first abutment surface acts on the buffer carriage, such that continued movement of the output shaft beyond said position moves the buffer carriage from the active configuration to a second passive configuration.

This may allow the buffer assembly to protect the actuator assembly from overtravel of the output shaft in both directions. For the avoidance of doubt, other embodiments may also allow this. For instance, the actuator assembly may be configured to be moved to the first disengaged configuration if the output shaft moves beyond either the extended position or the retracted position.

The second abutment surface may be a surface provided on the housing or output shaft, or may be provided on a component mounted thereto.

The buffer carriage may remain mounted on said one of the housing and output shaft when in it is in the second passive configuration.

In the above embodiment, the rotary portion may be rotatable about the actuator axis when the buffer carriage is in the second passive configuration.

Alternatively, it may remain rotationally restrained when in this configuration.

In a linear actuator assembly of the first aspect of the invention:
when the buffer carriage is in the active configuration, the rotary portion may be axially restrained relative to the one of the housing and output shaft to which it is mounted; and
the buffer carriage may be movable from the active configuration to the or a passive configuration by moving at least the rotary portion along the actuator axis, relative to the one of the housing and output shaft to which it was mounted when in the active configuration, beyond the range of movement to which it was restrained when in the active configuration.

The rotary portion may be substantially axially static when the buffer carriage is in the engaged configuration. In this case, any axial movement (beyond a limited amount of play) of the rotary portion would move the buffer carriage towards the or a disengaged configuration Reference to the rotary portion moving along the actuator axis is not intended to be limited to the rotary portion moving in a direction parallel to the actuator axis. It is intended to include movement of the rotary portion in any direction which has a vector component in the axial direction. For example, the rotary portion may move axially and radially outwards, or axially and tangentially. The buffer carriage may be movable from the active configuration to the or a passive configuration by moving at least the rotary portion in a direction substantially parallel to the actuator axis.

In a linear actuator assembly in which the buffer carriage is movable from the active configuration to the or a passive configuration by moving at least the rotary portion along the actuator axis, the linear actuator assembly may further comprise at least one limit surface positioned to limit said movement of the buffer carriage along the actuator axis. The linear actuator assembly may also comprise a second limit surface.

The use of limit surfaces may be beneficial in that the buffer carriage (or parts thereof) can be retained within the actuator assembly, rather than being ejected therefrom.

In one embodiment, the linear actuator assembly further comprises one or more deformable elements configured to be deformed during movement of the buffer carriage from the active configuration to the or a passive configuration.

Elements being deformed during movement of the buffer carriage may be beneficial in that they would dissipate energy which may otherwise contribute to damage to the actuator assembly or a workpiece.

The linear actuator assembly may comprise a plurality of deformable elements.

Where the linear actuator assembly comprises a plurality of deformable elements, at least two of said deformable elements may be configured to begin to be deformed at different points during the movement of the buffer carriage from the active configuration to the or a passive configuration. Instead or in addition, at least two deformable elements may finish being deformed (e.g. they may fracture) at different points during the movement of the buffer carriage.

The or at least one of the deformable elements may be configured to undergo plastic deformation during said movement of the buffer carriage. Alternatively or in addition, at least one deformable element may be configured to undergo elastic deformation Instead or in addition, the or at least one of the deformable elements may be configured to undergo shear deformation during said movement of the buffer carriage. Alternatively or as well, at least one deformable element may be configured to be compressed, stretched, twisted, bent and/or buckled, or configured to undergo any other suitable type of deformation.

In addition or instead, the or at least one of the deformable elements may be configured to fracture during said movement of the buffer carriage.

Any one deformable element may be configured to deform (and/or begin/end its deformation) in one or more than one of the manners indicated above. By way of an example, a linear actuator assembly may comprise two deformable elements that are configured to undergo plastic deformation, and also comprise two deformable elements which are configured to undergo shear deformation. Such an assembly may have two deformable elements each of which undergoes plastic shear deformation; four deformable elements where two deform plastically and the other two undergo shear deformation; or three deformable elements where one undergoes plastic deformation but not shear deformation, one undergoes shear deformation but not plastic deformation and one undergoes plastic shear deformation.

The buffer carriage may be biased towards the active configuration. It may be biased towards the engaged configuration from the/a/each passive configuration, or may be biased towards the engaged configuration from an intermediate configuration between the active configuration and said passive configuration. The buffer carriage may be biased by a resilient element such as a spring or elastomeric component, by magnetic attraction or repulsion, or may be biased in any other suitable fashion.

Alternatively, the buffer carriage may be biased away from the engaged configuration. It may be biased away from the engaged configuration towards the/a/each passive configuration, or may be biased away from the engaged configuration towards an intermediate configuration between the active configuration and said passive configuration. The buffer carriage may be biased by a resilient element such as a spring or elastomeric component, by magnetic attraction or repulsion, or may be biased in any other suitable fashion.

At least the rotary portion of the buffer cartridge may be mounted on or within a support structure; the support structure may be axially and rotationally restrained relative to the one of the housing and the output shaft on which the buffer carriage is mounted; and the buffer carriage may be movable from the active configuration to the or a passive configuration by moving it relative to the support structure.

Substantially all the buffer carriage may be mounted on or within the support structure.

The support structure may be substantially axially static, and/or substantially rotationally static, relative to the one of the housing and the output shaft on which the buffer carriage is mounted.

The support structure may be substantially cylindrical or tubular, or may be of any other suitable shape.

The actuator assembly may comprise one or more plain bearings mounted to the support structure and in slidable connection with the one of the housing and output shaft on which the buffer carriage is not mounted.

Where a linear actuator assembly has a support structure and one or more deformable elements, the or at least one of the deformable elements may be received partially in a void in the support structure and partially in a void in the buffer carriage.

The term 'void' is intended to refer to the absence of material. It includes, for example, apertures, bores and grooves. 'Void' also includes space beyond the end of a feature or component. For example, a void in a component of the buffer carriage may be the space beyond one of its longitudinal ends.

Where the or at least one of the deformable elements are so received, the or at least one of the deformable elements may take the form of a ring received in substantially annular voids in the support structure and buffer carriage.

The ring and/or one or both of said voids may be segmented or incomplete (e.g. circlip)

Instead or in addition, the or at least one of the deformable elements may take the form of a substantially prismic or cylindrical rod.

For the avoidance of doubt, the term 'prismic' is intended to include oblique prisms and antiprisms, as well as right prisms. Any such prism may have one or more arcuate faces.

The rod(s) may be aligned substantially perpendicular to the actuator axis. For example, they may be substantially radially aligned.

Where the linear actuator assembly has a support structure:
  one of the rotary portion and the support structure may have a first interlocking portion, and the other may have a second interlocking portion;
  with the buffer carriage in the active configuration, the first and second interlocking portions may be interlocked so as to rotationally couple the rotary portion and the support structure and thereby rotationally restrain the rotary portion;
  with the buffer carriage in the or a passive configuration, the first and second interlocking portions may be not interlocked and thus no longer rotationally couple the rotary portion and the support structure, the rotary portion thereby being rotatable about the actuator axis.
Optionally:
  the first interlocking portion may comprise a projection;
  the second interlocking portion may comprise an aperture which adjoins an annular void positioned substantially circumferentially about the actuator axis;
  with the first and second interlocking portions interlocked the projection may be received within the aperture, the walls of the aperture limiting the angular movement of the projection, thereby rotationally coupling the first and second interlocking portions and thus rotationally restraining the rotary portion; and
  with the buffer carriage in the or a passive configuration the projection may be received within the annular void, the annular void acting as a circumferential runway for the projection and thereby allowing the rotary portion to rotate about the actuator axis.

Alternatively, the interlocking portions may take different forms. For instance, they may comprise a polygonal boss receivable within a complementary polygonal bore.

The support structure may be a separate component to the one of the housing and the output shaft to which the buffer carriage is mounted, and may be releasably attachable to said one of the housing and the output shaft via mutually complementary engagement features.

The mutually complementary engagement features may have any suitable configuration. For instance, they may comprise be screw threads (for instance the support structure and the housing or output shaft may screw together directly or via a connecting nut), flanges forming part of a compression cage, and/or alignable apertures for receipt of one or more friction-fit or screw-in connecting pins. There may be any suitable number of apertures, arranged in any suitable configuration. For instance, the support structure and the housing or output shaft may each comprise a single aperture, or may comprise 2, 3, 4 or more apertures. Where the support structure and/or the housing of output shaft has more than one aperture, the apertures may be arranged in a substantially circumferential array. They may be regularly spaced (for instance they may be regularly spaced, or spaced in a repeating pattenr), or irregularly spaced in said array, and may or may not be axially spaced from each other in said array.

According to a second aspect of the present invention there is provided a stroke-limiting assembly for a linear actuator assembly, the stroke-limiting assembly comprising a support structure and buffer carriage according to the first aspect of the invention.

A stroke-limiting assembly according to the second aspect of the invention may be beneficial in that it can be applied to existing actuators so as to produce an actuator assembly according to the first aspect of the invention.

According to a third aspect of the present invention there is provided a buffer carriage for a linear actuator assembly according to the first aspect of the invention.

A buffer carriage according to the third aspect of the invention may be similarly beneficial in that it can be applied to existing actuators so as to produce an actuator assembly according to the first aspect of the invention.

According to a fourth aspect of the present invention there is provided a spot-joining apparatus comprising a linear actuator assembly according to the first aspect of the invention, wherein the output shaft of the linear actuator assembly is connected to a punch for driving a fastener or die, or effecting a clinching or friction stir spot welding operation.

A spot-joining apparatus according to the fourth aspect of the invention may have increased longevity due to the advantages discussed in relation to the first aspect of the invention.

According to a fifth aspect of the invention there is provided a method of manufacturing a product, the method comprising fastening together two or more layers of a workpiece using an apparatus according to the fourth aspect of the invention.

A method according to the fifth aspect of the invention may be performed with reduced down-time due to the increased apparatus longevity highlighted above.

According to a sixth aspect of the invention there is provided a product comprising a workpiece formed from two or more layers fastened together using an apparatus according to the fourth aspect of the invention and/or a method according to the fifth aspect of the invention.

Such a product may be produced advantageously cheaply due to the reduced down-time highlighted above.

In relation to the fifth and sixth aspects of the invention, the product may be a vehicle (such as a motorcycle, car, van, lorry or aircraft). Examples of layers of a workpiece include the chassis of a vehicle, thermal/acoustic insulation panels and vehicle bodywork panels.

The term 'rotationally coupled' is used herein to describe a connection between two components in which rotation of one of said components causes rotation of the other, and conversely that one of said components being prevented from rotation means that the other of said components is also unable to rotate. It is to be understood, however, that two rotationally coupled components may exhibit a limited amount of rotational 'play' relative to one another.

Reference to a component being 'rotationally restrained' describes the rotational freedom of that component being limited relative to the actuator as a whole. For instance, in one embodiment when the rotary portion is rotationally restrained it may be able to rotate by less than 360 degrees. Similarly, the term 'axially restrained' is used to describe the component in question having limited axial freedom. Where a first component is described as being rotationally or axially restrained relative to a second component, this refers to the movement of the first component relative to the second component being limited in the above manner.

The term 'rotationally static' is used to describe a component which cannot rotate about the actuator axis in the frame of reference of the actuator as a whole (again, it is to be understood that a rotationally static component may exhibit a limited amount of rotational 'play'). For the avoidance of doubt, a rotationally static component may be rotated about the actuator axis along with the actuator as a whole, for instance if the entire actuator is rotated by a robotic arm. The term 'axially static' refers to a component which cannot move axially in the frame of reference of the actuator as a whole (with the exception of a limited amount of axial 'play'). Where a component is described as being axially or rotationally static relative to another component, this refers to said two components being unable to move axially or rotationally relative to one another (with the exception of a limited amount of axial or rotational 'play') rather than within the frame of reference of the actuator as a whole.

For the avoidance of doubt, reference the buffer carriage moving to 'the or a passive configuration' is used to refer to the buffer carriage moving to the first passive configuration and/or the second passive configuration.

BRIEF DESCRIPTION OF THE DRAWINGS

Specific embodiments of the present invention will now be described, by way of example only, with reference to the accompanying drawings in which.

DETAILED DESCRIPTION

Figure 1:
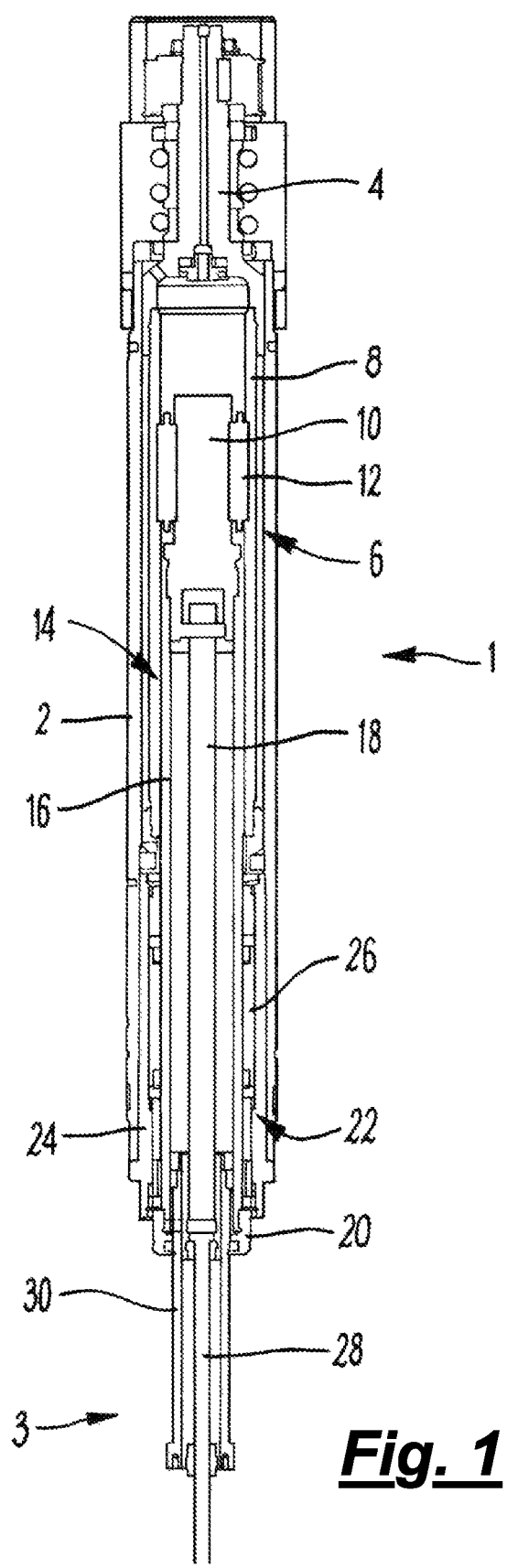
FIG. 1 is a cross-sectional side view of a linear actuator assembly according to a first embodiment of the invention.

FIG. 1 shows a linear actuator assembly according to a first embodiment of the invention. The actuator assembly comprises an actuator 1, more specifically a motor-driven electric linear actuator, rivet-handling components 3 and a stroke-limiting assembly 22. The actuator 1 has a housing 2, which is rotationally static, and a drive shaft 4 driven by a motor (not visible). This embodiment uses a roller screw mechanism 6. The drive shaft 4 is connected to a roller nut tube 8, which is an example of first threaded member, so that as the drive shaft is rotated by the motor the roller nut tube rotates with it. The roller nut tube 8 is meshed with a second threaded member in the form of a roller screw shaft 10. In this case, the first and second threaded members 8, 10 are meshed indirectly, via plurality of intermediate threaded members in the form of rollers 12. The rollers 12 are arranged in a substantially circumferential array about the roller screw shaft 10.

The roller screw shaft 10 is connected to the output shaft 14 of the actuator 1, which in this embodiment comprises an outer tube 16 and a plunger 18 coaxially received therein. The outer tube 16 and plunger 18 are fixed to one another and to the roller screw shaft 10 so as to form a single unit. The output shaft 14 defines a longitudinal axis, which is vertical in FIG. 1. The output shaft 14 terminates in a distal end nut 20. In normal use the output shaft 14 is prevented from rotation, as explained below. As such, by rotating the roller nut tube 8 in one direction the output shaft 14 can be moved along its longitudinal axis (which is also the longitudinal axis of the actuator 1 as a whole) towards an extended position relative to the housing 2. By rotating the roller nut tube in the other direction the output shaft 14 can be moved along its longitudinal axis towards a retracted position relative to the housing 2. In this case the output shaft 14 is mounted telescopically within the housing 2. As such, when the output shaft 14 is in the retracted position it is at least partially received within the housing 2, and when it is in the extended position it projects from it. As shown in FIG. 1, in this embodiment when the output shaft 14 is in the retracted position it is almost fully received within the housing 2.

At the front end of the housing 2 (the front being the end from which the output shaft can be extended), the actuator assembly has a stroke-limiting assembly 22 for restricting axial movement of the output shaft 14. The stroke-limiting assembly 22 has a support structure in the form of a casing 24, which is substantially cylindrical and is positioned substantially circumferentially about the output shaft longitudinal axis. The casing 24 is secured to the housing by a pair of threaded pins (not shown). The housing 2 has a pair of threaded bores (not visible) and the casing 24 a pair of non-threaded bores (not visible). In this embodiment the bores are substantially radially oriented, and the bores of each pair are substantially diametrically opposite to one another. With the housing 2 and casing 24 positioned to be secured together their respective bores are aligned, allowing each pin to be screwed into one of the bores in the housing 2 until its tip projects into one of the bores in the casing 24, securing the housing and casing together. The pins (not visible) therefore rotationally restrain the casing 24 by rotationally coupling it to the housing 2. As the housing 2 is rotationally static the casing is also rotationally static. The pins also axially restrain the casing, holding it axially fixed relative to the housing 2 (and therefore axially fixed in relation to the actuator as a whole). Positioned within the casing 24 is rotary portion 26. The rotary portion 26 has a diametrically-opposed pair of keys (not visible in FIG. 1) which project into complementary keyways (not visible in FIG. 1) in the outer tube 16 of the output shaft 14. The rotary portion 26 and output shaft 14 are therefore rotationally coupled. As explained in more detail below, in normal use the rotary portion 26 is rotationally static. More particularly, in this case the rotary portion 26 is rotationally coupled to the casing 24, which as explained above is rotationally static.

The actuator assembly also has rivet-handling components 3 mounted to the actuator 1. In this embodiment the rivet-handling components are a punch 28 for driving a self-piercing rivet, and a clamp tube 30 on which a tool nose (not visible) can be fitted for feeding self-piercing rivets to the punch and for clamping a workpiece in place during riveting. The structure and function of these components would be readily understood by those familiar with SPR, and therefore will not be described here.

Figure 2:
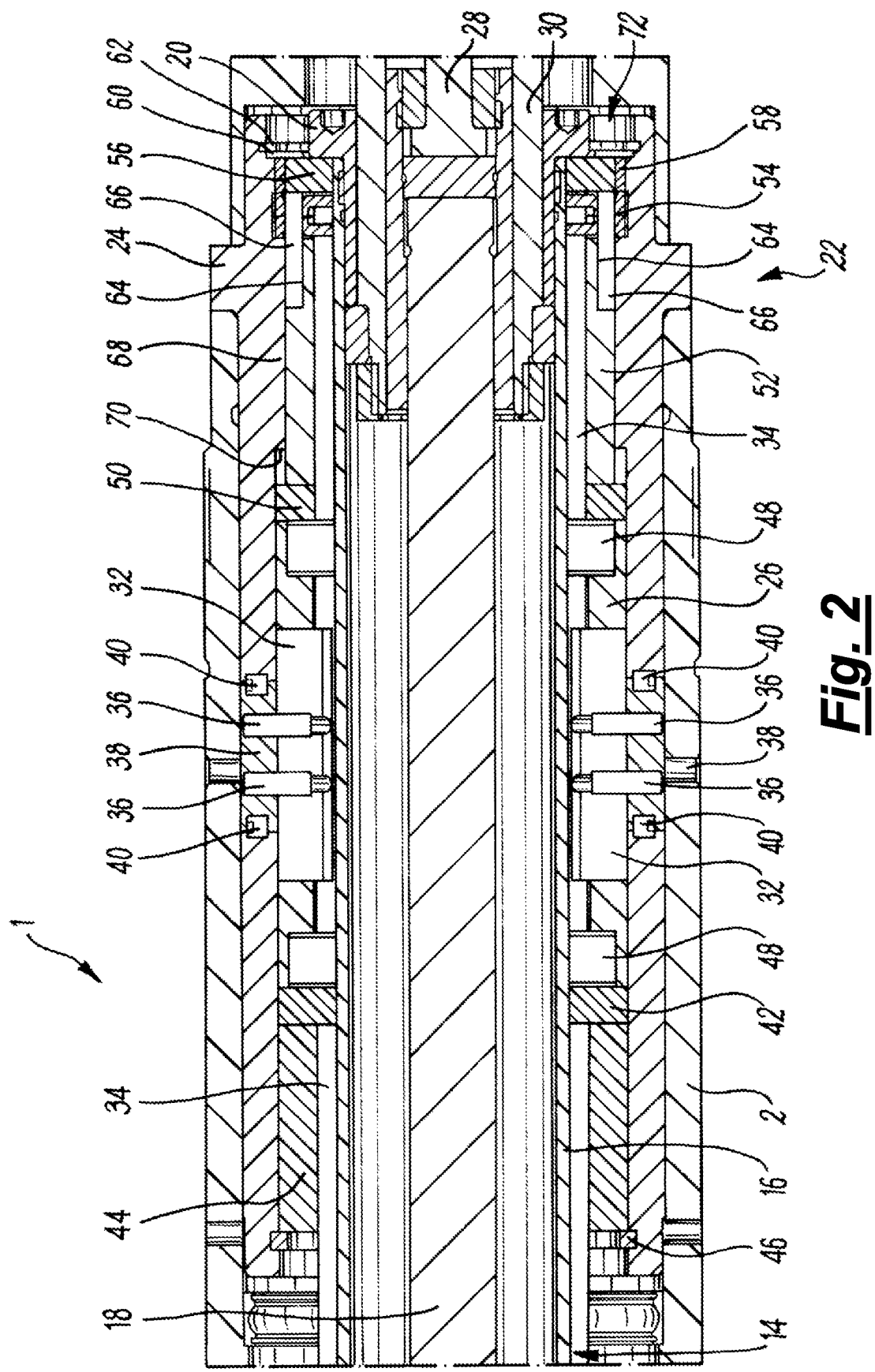
FIG. 2 is an enlarged cross-sectional side view of a portion of the first embodiment.
Figure 3:
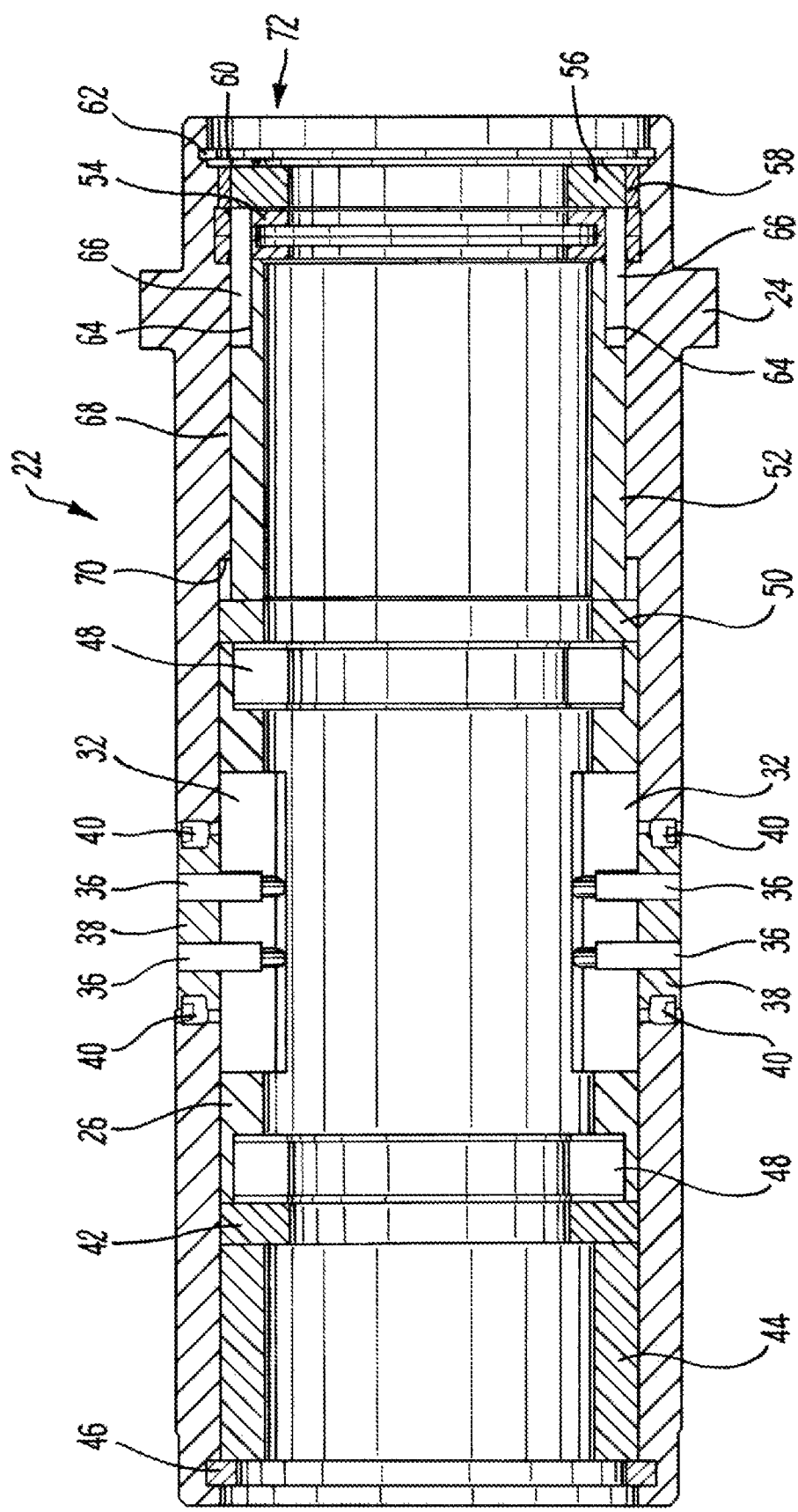
FIG. 3 is a cross-sectional side view of a stroke-limiting assembly of the first embodiment, with a buffer carriage in an active configuration.
Figure 4:
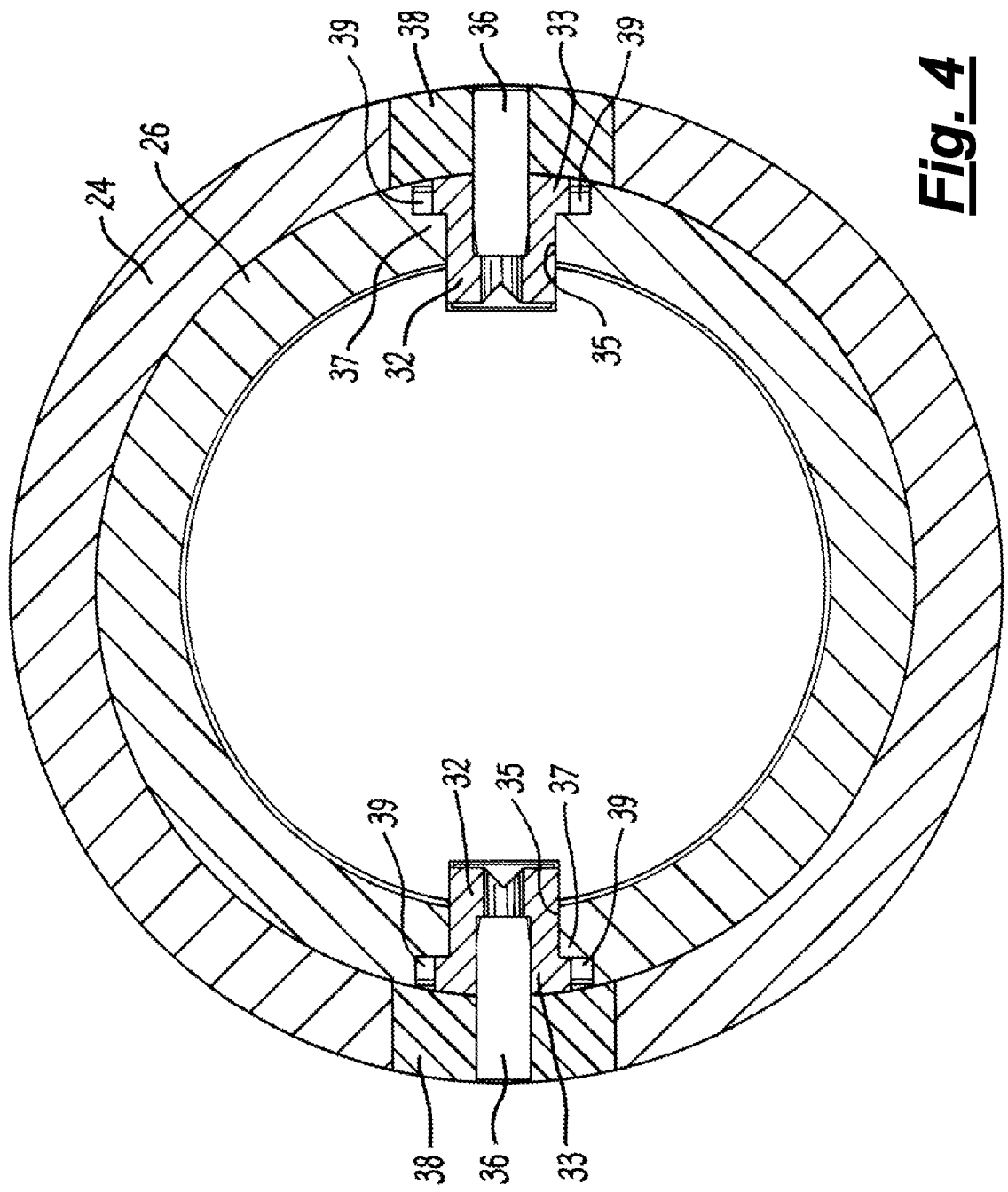
FIG. 4 is a cross-sectional end view of the stroke-limiting assembly of the first embodiment.

FIG. 2 shows the front end of the housing 2 in more detail, and FIGS. 3 and 4 show the stroke-limiting assembly 22 in isolation. These figures show the keys 32 of the rotary portion 26, received in keyways 34 in outer tube 16 of the output shaft. Each key 32 is substantially cuboidal and a flange 33 at its radially outer face. Each key 32 is received within a complementarily-shaped aperture 35 in the rotary portion 26, with its flange 33 abutting a shoulder section 37 of the aperture to prevent the key moving radially inwards. The keys are prevented from moving radially outwards by set screws 39, as described in more detail below.

In the configuration shown in FIG. 2 the rotary portion 26 is rotationally restrained. More particularly, in this embodiment the keys 32, and therefore the entire rotary portion 26 of the stroke-limiting assembly 22, are rotationally coupled to the casing 24, which in turn is rotationally coupled to the (rotationally static) housing 2. The rotary portion 26 is rotationally coupled to the casing 24 by deformable elements in the form of shear pins 36. The shear pins 36 also axially restrain the rotary portion 26, in this case holding it axially static relative to the casing 24 and housing 2. In this embodiment the shear pins are aligned substantially radially about the longitudinal axis of the actuator 1 output shaft. Each shear pin 36 is received partially in an aperture in a key 32 and partially in an aperture in the casing 24, and exhibits a friction fit with each of said apertures. In this embodiment, the casing 24 has retainer sections 38 positioned adjacent to the keys for receipt of the shear pins 36 therein. The retainer sections 38 are releasably secured in place in the casing 24 by set screws 40. The retainer sections 38 can therefore be removed from the rest of the casing 24 so as to enable easier assembly or reassembly. For instance, the pins 36 can be inserted into the keys 32 before simply placing the retainer sections 38 on top, as opposed to having to precisely align the apertures in the casing and the key before driving the pins into place.

To the rear of the rotary portion 26 (to the left in FIG. 2) is a rear stop ring 42, beyond which is a rear plain bearing 44. The rear stop ring acts as a contact surface on which the output shaft 14 can act, as explained below. The rear plain bearing 44 provides lateral support to the output shaft 14, while introducing minimal friction as it moves between the extended and retracted positions. The rear plain bearing 44 is retained within the casing by a rear circlip 46 positioned within an annular groove in the inner surface of the casing 24. The rear stop ring 42 and the rotary portion co-operatively define an annular cavity within which a lubricating pad 48 is received. The lubricating pad 48 consists of felt wadding impregnated with lubricant such as oil, and acts to ensure that a layer of lubricant is maintained around the circumference of the outer tube 16 (including the keyways 34).

Forwards (to the right in FIG. 2) of the rotary portion 26 is a thrust washer 50, and forwards of that is a front plain bearing 52, which functions in the same way as the rear plain bearing 44. The thrust washer 50 is positioned to allow the transfer of axial force between the rotary portion 26 and the front plain bearing 52. The thrust washer 50 and rotary portion 26 co-operatively form another annular cavity within which an additional lubricating pad 48 is received. To the front of the front plain bearing 52 is a wiper seal 54, which is a ring of elastomeric material which contacts the outer tube 18 of the output shaft 14 about substantially all of its circumference. The wiper seal 54 acts to prevent egress of lubricant supplied by the lubricating pads, and ingress of dirt or debris from outside the housing. Forwards of the wiper seal 54 is a front stop ring 56, which is diametrically smaller than the internal diameter of the casing 24. The front stop ring 56 is held concentric with the casing by a spacer ring 58, and like the rear stop ring acts as a contact surface for interface with the output shaft 14. The front stop ring 56 and spacer ring 58 are retained in the casing by a front washer 60, which in turn is retained by a front circlip 62. The front portion of the front plain bearing 52 has a substantially circumferential array of four longitudinal channels 64, each of which receives a force transfer pin 66. The force transfer pins run substantially along the output shaft axis, through apertures in the wiper seal 54, and abut the front stop ring 56. The force transfer pins 66 act to bridge the relatively soft wiper seal 54, preventing any slight axial movement of the front stop ring 56, during movement of the output shaft 14 between the extended and retracted positions, from deforming the wiper seal and disrupting its function. The casing 24 has a section of reduced internal diameter 68 in the region of the front plain bearing 52. The region of reduced internal diameter 68 defines a shoulder 70.

It will be apparent from FIGS. 2-4 that the rear and front plain bearings 44, 52, rear and front circlips 46, 62, thrust washer 50, spacer ring 58 and front washer 60 are each substantially annular in shape, and are positioned substantially circumferentially about the longitudinal axis of the output shaft 14. They are each therefore substantially coaxial with each other and with the casing 24. The front and rear thrust washers, lubricating pads 48, rotary portion 26 and wiper seal 54 are also substantially annular and substantially circumferential about the output shaft longitudinal axis. However, these components also have protrusions which project into the keyways in the outer tube 16 (in the case of the rotary portion 26, these protrusions are the radially inner portions of the keys 32).

The rotary portion 26, rear and front plain bearings 44, 52, rear and front stop rings 42, 56, force transfer pins 66, lubricating pads 48, thrust washer 50 and front washer 60 together form a buffer carriage 72. FIGS. 2-4 show the buffer carriage 72 in an active configuration, in which the shear pins 36 prevent the rotary portion 26 from rotating. With the rotary portion 26 prevented from rotating, the buffer carriage 72 is 'active' in that it prevents the output shaft 14 from rotating. The buffer carriage 72 is movable from this active configuration to a first passive configuration as described below in relation to FIG. 5, and to a second passive configuration as described below in relation to FIG. 6. In each of the first and second passive configurations the shear pins 36 have been fractured, due to axial movement of the rotary portion 26, and no longer prevent rotation of the rotary portion. The rotary portion 26, and thus the output shaft 14, is therefore able to rotate. With the buffer carriage 72 in either of these configurations, it is 'passive' in that it does not prevent rotation of the output shaft 14.

In this embodiment, to move the buffer carriage 72 to the first passive configuration the rotary portion 26, front plain bearing 52, stop rings 42, 56, force transfer pins 66, lubricating pads 48 and thrust washer 50 are all moved forwards along the actuator axis (the longitudinal axis of the output shaft 14) relative to the casing 24 and thus relative to the actuator housing 2. The forward direction is to the right in FIGS. 2 and 3. To move the buffer carriage 72 to the second passive configuration, the rotary portion 26, front and rear plain bearings 52, 44, stop rings 42, 56, force transfer pins 66, lubricating pads 48 and thrust washer 50 are moved backwards (to the left in FIGS. 2 and 3) along the output shaft longitudinal axis relative to the casing 24 and thus relative to the actuator housing 2.

The buffer carriage 72 of this embodiment is movable from the active configuration to the first passive configuration by moving the above specified components forwards relative to the casing 24 in a direction substantially in line with the output shaft longitudinal axis. As such, when the buffer carriage 72 is in the first passive configuration it reaches further forwards within casing than when it is in the active configuration. Similarly, the buffer carriage 72 is movable from the active configuration to the second passive configuration by moving the above specified components backwards relative to the casing 24 in a direction substantially in line with the output shaft longitudinal axis. Therefore, when the buffer carriage 72 is in the second passive configuration it reaches further backwards within casing than when it is in the active configuration.

During normal operation of the actuator assembly, with the output shaft 14 moving between the retracted and extended positions, the buffer carriage 72 remains in the active configuration. In this configuration, the shear pins 36 projecting from the casing 24 into the rotary portion 26 (in this case projecting from the retainer sections 38 of the casing into the keys 32 of the restraint section) rotationally couples the casing 24 and rotary portion 26. The rotary portion 26 is therefore rotationally static in this configuration and the output shaft 14, being rotationally coupled to the rotary portion 26, is also rotationally static. When the roller nut tube (8 in FIG. 1) is rotated by the motor (not visible), the shear pins 36 withstand the torque it applies to the output shaft (via the roller screw shaft, 10 in FIG. 1), and therefore the output shaft moves linearly.

Figure 5:
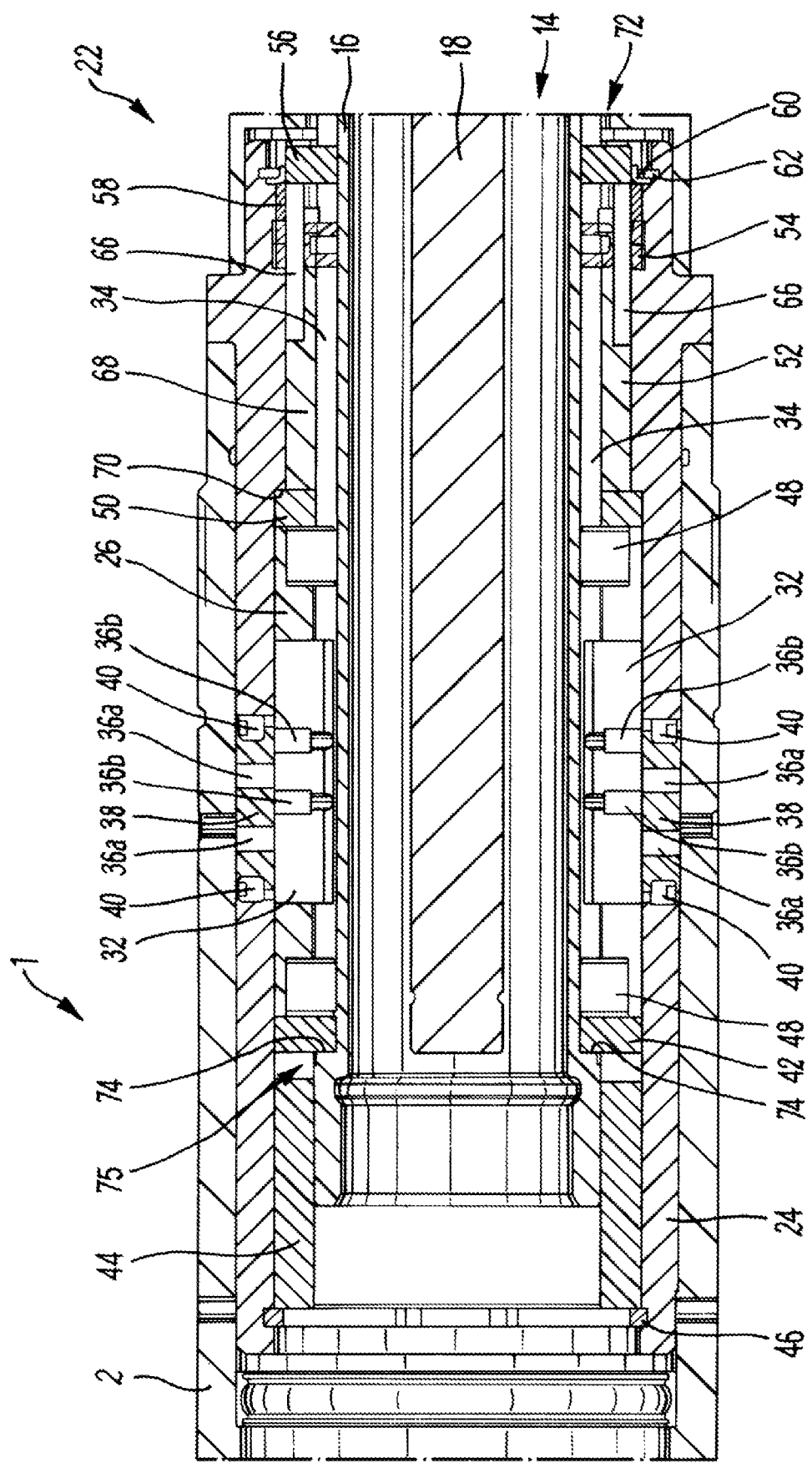
FIG. 5 is a cross-sectional side view of the stroke-limiting assembly of the first embodiment with the buffer carriage in a first passive configuration.

Referring now to FIGS. 2 and 5 in combination, when the output shaft 14 is in the extended position, abutment surfaces 74 (each of which is an example of a 'first abutment surface') at the ends of the keyways 34 in the outer tube 18 contact the rear stop ring 42. If the output shaft 14 is driven forwards (to the right in FIGS. 2 and 5) beyond the extended position (for instance by the motor due to an error in the actuator control algorithm, or by external tooling failure allowing it to overtravel under its own momentum), the abutment surfaces 74 exert an axial force on the rear stop ring 42, urging it forwards. The rear stop ring 42 transmits this force to the rotary portion 26, which in turn transfers this force into shear stress in the shear pins 36. If the force urging the output shaft 14 forwards is relatively weak, the shear pins 36 withstand the shear stress exerted on them. The rear stop ring 42 therefore braces against the rotary portion 26, which is held axially stationary by the shear pins 36, and prevents the output shaft 14 moving any further.

If, on the other hand, the force urging the output shaft 14 forwards is relatively strong, the shear stress in the shear pins 36 is sufficient to plastically deform them. Plastic deformation of the shear pins 36 allows the rear stop ring 42 and the rotary portion 26 to be moved forward by the abutment surfaces 74 of the output shaft 14. This produces a gap 75 between the (stationary) rear plain bearing 44 and the rear stop ring 42. As the rotary portion 26 moves forward, it forces the thrust washer 50 forwards, which in turn forces the front plain bearing 52 and the force transfer pins 66 forwards as well. As the front plain bearing 52 moves forwards it deforms the wiper seal 54 (the radially outer portion of which is held axially stationary by the spacer ring 58), and as the force transfer pins 66 move forward they push the front stop ring 56 forward, which deforms the front washer 60. As the rotary portion 26, rear stop ring 42 and thrust washer 50 all move forwards, the lubricating pads 48 move similarly. The deformation of the shear pins 36 therefore allows the buffer carriage 72 to move towards the first passive configuration.

During movement of the buffer carriage 72, deformation of the shear pins 36 dissipates some of the energy of the collision so that less is available to damage the actuator assembly or a workpiece. In addition, deformation of the wiper seal 54 and front washer 60 dissipates additional energy. Also, in this embodiment the front and rear plain bearings 52, 44 have an interference fit with the casing 24, so the output shaft 14 moving them forwards within the casing dissipates further energy through friction. If the force of the collision is high enough, the extent of shear deformation experienced by the shear pins 36 will be sufficient to fracture each into two pieces 36a, 36b along the boundary between the keys 32 and the casing 24. Once the shear pins 36 have fractured, the buffer carriage 72 has reached the first passive configuration. FIG. 5 shows the buffer carriage 72 in the first passive configuration.

With the shear pins 36 fractured (i.e. with the buffer carriage 72 in the first passive configuration), the rotary portion 26 is no longer rotationally coupled to the casing 24 (and housing 2). The rotary portion 26, and thus the output shaft 14, is therefore no longer rotationally static and is able to rotate about the output shaft longitudinal axis. Once the output shaft 14 becomes free to rotate, friction in the threads of the roller screw mechanism 6 (see FIG. 1) causes it to do so. As such, the output shaft 14 ceases to move axially and any remaining energy in the roller screw mechanism, which would otherwise be available to cause damage to the actuator assembly, is diverted into producing rotary motion. For example, in a situation where the punch 28 (see FIGS. 1 and 2) would otherwise contact a workpiece and produce sufficient loading in the roller screw mechanism 6 (see FIG. 1) to damage it, the output shaft 14 being able to rotate allows the potentially damaging energy to be dissipated through friction while the output shaft 'freewheels' to a stop. As the output shaft 14 rotates, the wiper seal 54 is prevented from rotating by the force transfer pins 66. The portions of the wiper seal received in the keyways 34 must therefore either detach and rotate along with the output shaft 14, or deform and be released from the keyways 34. In either case, this may assist in the dissipation of energy as the output shaft 14 rotates.

As an additional feature, in this embodiment the forward movement of the buffer carriage 72 beyond the first passive configuration is limited by the thrust washer 50 contacting the shoulder 70 of the casing 24. In other words, the shoulder 70 provides a limit surface. As the thrust washer 50, rotary portion 26 and rear stop ring 42 are then prevented from any further axial movement, the output shaft 14 is also forced to stop. This prevents any linear inertia of the output shaft 14, remaining after energy dissipation and redirection as described above, from driving the output shaft forwards (as it rotates) sufficiently to partially disengage the rollers 12 from the roller nut tube 8. If the rollers 12 were to become partially disengaged, for instance by projecting forwards beyond the end of the roller nut tube 8 as would be the case here, the area of interface between the roller nut tube 8 and the rollers 12 would be decreased. Any loading in these components would therefore be exerted over a smaller area, which would increase the pressure experienced by the threads and thus the likelihood of damage to the threads. In this embodiment the shoulder 70 is positioned to prevent any disengagement between the rollers 12 and the roller nut tube 8. However, in other embodiments the threads of the threaded members 8, 10, 12 may be sufficiently robust to withstand partial disengagement, at which point the shoulder may be positioned to prevent disengagement beyond the extent which can be tolerated by the threads.

Figure 6:
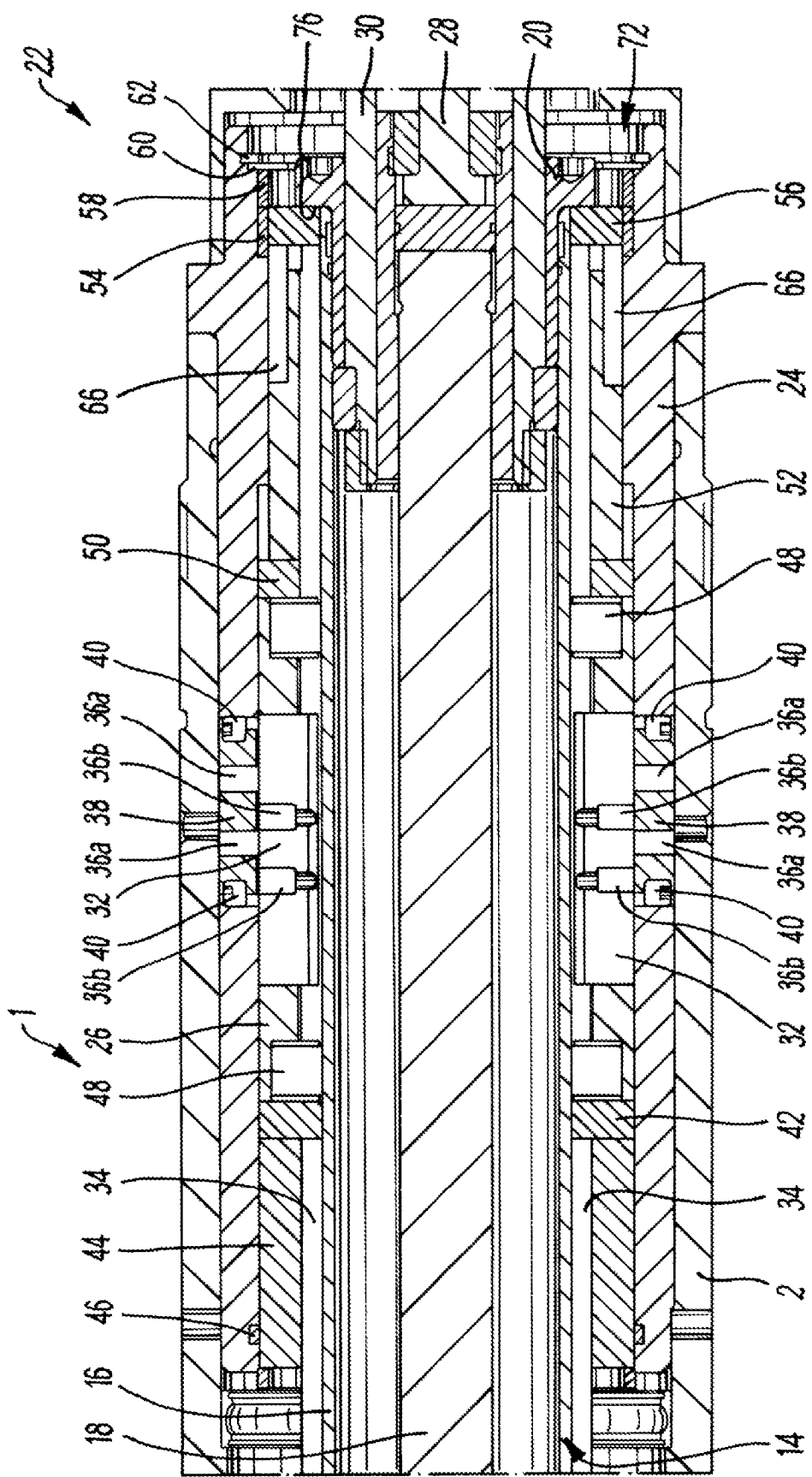
FIG. 6 is a cross-sectional side view of the stroke-limiting assembly of the first embodiment with the buffer carriage in a second passive configuration.

Referring now to FIGS. 2 and 6 in combination, with the buffer carriage 72 in the active configuration, when the output shaft 14 is in the retracted position an annular abutment surface 76 (an example of a 'second abutment surface') provided on the distal end nut 20 of the output shaft 14 contacts the front stop ring 56. If the output shaft 14 is driven backwards (to the left in FIGS. 2 and 6) beyond the retracted position, the abutment surface 76 exert an axial force on the front stop ring 56, urging it backwards. This force is transmitted from the stop ring, through the force transfer pins 66 and front plain bearing 52, through the thrust washer 50 and to the rotary portion 26. As described above, if the force urging the output shaft 14 beyond the retracted position is relatively low, the shear pins 26 will hold the buffer carriage 72 stationary and the output shaft will be forced to stop. Similarly, if the force is relatively large the shear pins 36 will deform and permit axial movement of the rotary portion 26. Deformation of the shear pins 36 allows the front stop ring 56, front plain bearing 52, force transfer pins 66, thrust washer 50 and rotary portion 26 to all be moved backwards by the abutment surface 76 of the output shaft 14. As the rotary portion 26 moves backwards, it forces the rear stop ring 42 and rear plain bearing 44 backwards as well. As the front stop ring 56 moves backwards it deforms the wiper seal 54 (the radially outer portion of which is held axially stationary by the section of reduced internal diameter 68 of the casing 24), and as the rear plain bearing 44 moves backwards it deforms the rear circlip 46. Since the rotary portion 26, rear stop ring 42 and thrust washer 50 all move backwards, the lubricating pads 48 move similarly. The buffer carriage 72 therefore moves towards the second passive configuration.

As with movement of the buffer carriage 72 to the first passive configuration, during movement of the buffer carriage to the second passive configuration energy is dissipated through deformation of the shear pins 36 and wiper seal 54 (although not the front washer 60), and through movement of the plain bearings 44, 52. In addition, energy is dissipated by deformation of the rear circlip 46. If the force of the collision is high enough, the extent of deformation experienced by the shear pins 36 will be sufficient to fracture each into two pieces 36a, 36b along the boundary between the keys 32 and the casing 24. Once the shear pins 36 have fractured, the buffer carriage 72 has reached the second passive configuration, as shown in FIG. 6.

As with the first passive configuration, with the buffer carriage 72 in the second passive configuration the shear pins 36 being fractured means that the rotary portion 26 is no longer rotationally coupled to the casing 24 (or the housing 2). The rotary portion 26, and thus the output shaft 14, will therefore rotate about the output shaft longitudinal axis, dissipating any remaining energy in the roller screw mechanism (6 in FIG. 1) and preventing the output shaft from moving any further backwards.

Once the buffer carriage 72 has been moved to the first or the second passive configuration, it is usually desirable for the actuator assembly and/or workpiece to be inspected and repaired if necessary. The fact that the output shaft 14 will rotate rather than moving linearly when the buffer carriage 72 is in the first or second passive configuration provides an additional benefit in that once an error has led to the output shaft travelling beyond the extended or retracted position, at least the shear pins 36 must be replaced before the actuator 1 will operate. This minimises the opportunity for the actuator assembly to be erroneously returned to service before inspection has taken place.

In the case of the first embodiment, the casing 24 being mounted to the housing 2 via removable pins (as explained above), allows it to be removed from the housing 2 and remounted to it with ease. The pins (not visible) can be unscrewed from their respective bores in the housing 2 until they no longer project into the bores in the casing 24, at which point the casing can be removed. The stroke-limiting assembly 22 can then be serviced (for instance the plain bearings 44, 52, rotary portion 26, stop rings 42, 56, thrust washer 50 and lubricating pads 48 can be repositioned, and the shear pins 36, wiper seal 54 and front washer 60 can be replaced). The stroke-limiting assembly 22 may be removed, serviced and replaced while the linear actuator assembly 1 is idle. Alternatively, the stroke-limiting assembly 22 may be removed and replaced with a spare, allowing the linear actuator assembly 1 to return to service while the original stroke-limiting assembly 22 is serviced at leisure.

The buffer carriage being movable to the first and second passive configurations via axial movement of the rotary portion, for instance as described above, may be particularly beneficial in that it can allow the axial force applied to the buffer carriage to determine whether or not it moves to the or a disengaged configuration. This, in turn, can allow more accurate control the point at which the output shaft can rotate. For instance, if the invention were applied to a linear actuator of the kind described in the introduction, with the threaded members able to withstand 140 Nm or 140 Kn and the shear plane of the shear pins being 2 cm radially outwards from the actuator axis, the operating window for the shear pins would increase considerably. If the pins were sheared by axial force rather than torque, the threaded members would remain undamaged as long as the pins reliably fracture when a shear load of 140 kN is applied. With the shear pins having to resist 4 kN shear loading without fatigue due to the torque applied to the output shaft during normal operation (as explained previously), this equates to an operating window of 136 kN, rather than 3 kN. Thus, the requirements placed on the shear pins in terms of dimensions and hardness are dramatically reduced.

Figure 7:
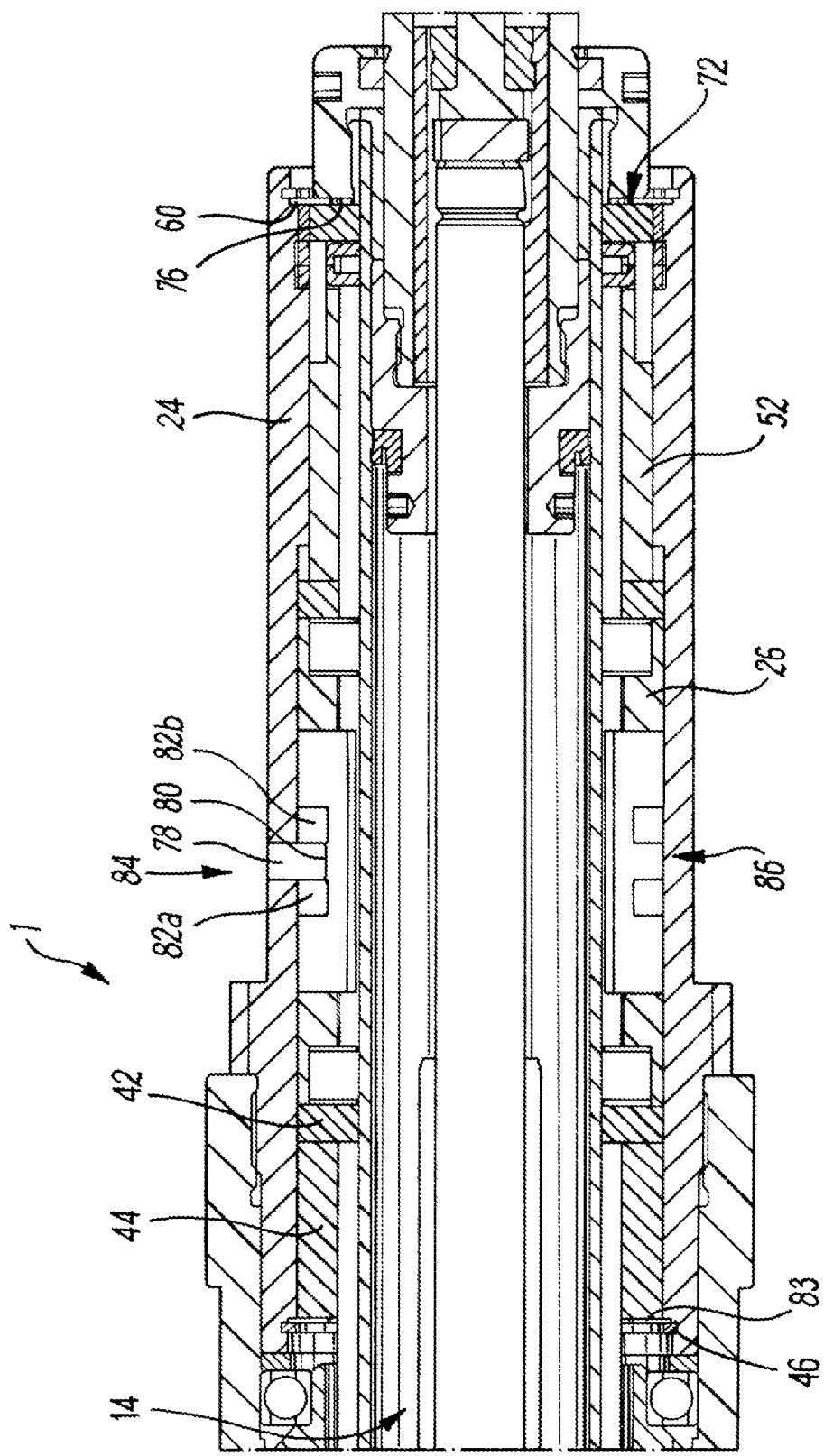
FIG. 7 is a cross-sectional side view of a portion of a linear actuator assembly according to a second embodiment of the invention.
Figure 8:
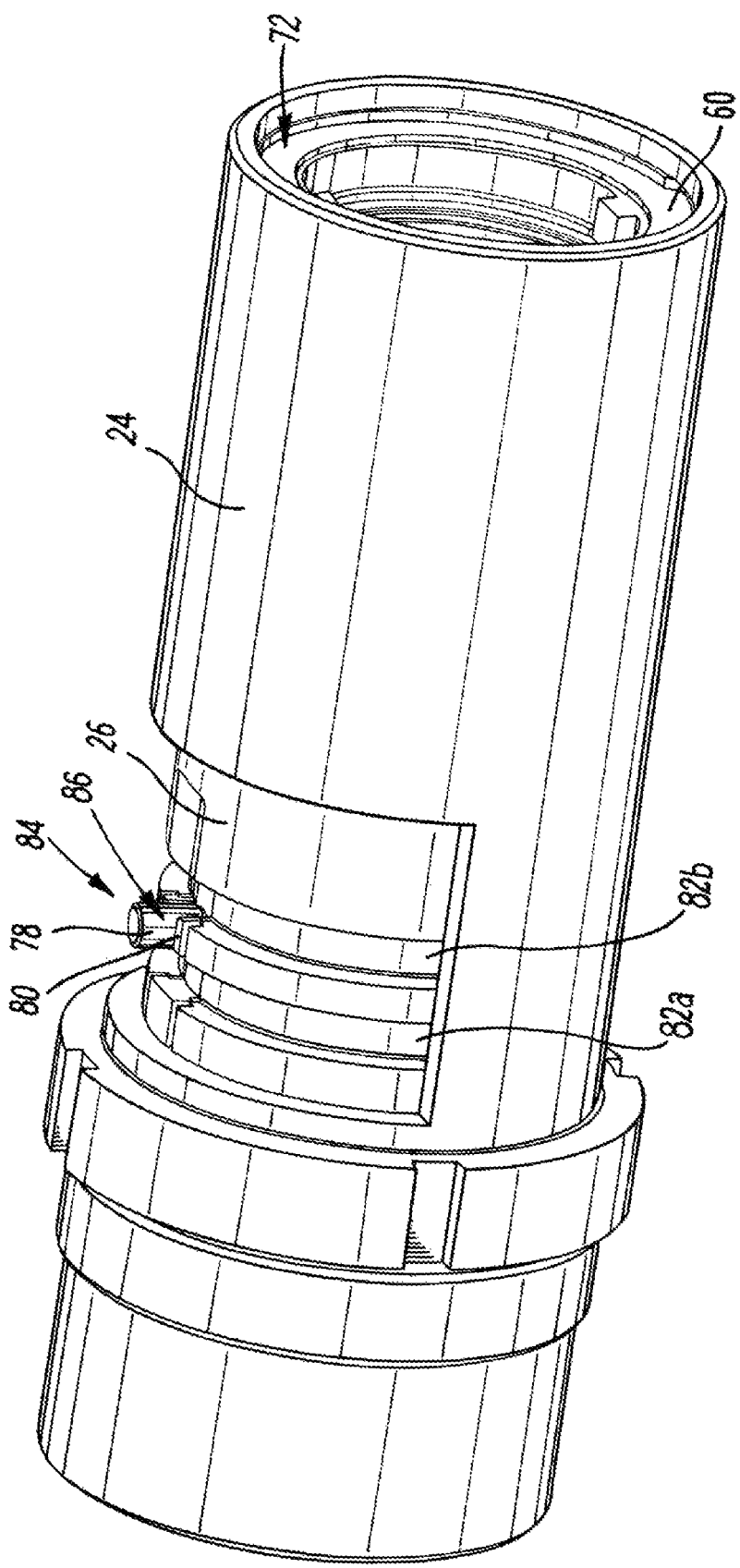
FIG. 8 is a cutaway perspective view of a stroke-limiting assembly of the second embodiment, with a buffer carriage in an active configuration.
Figure 9:
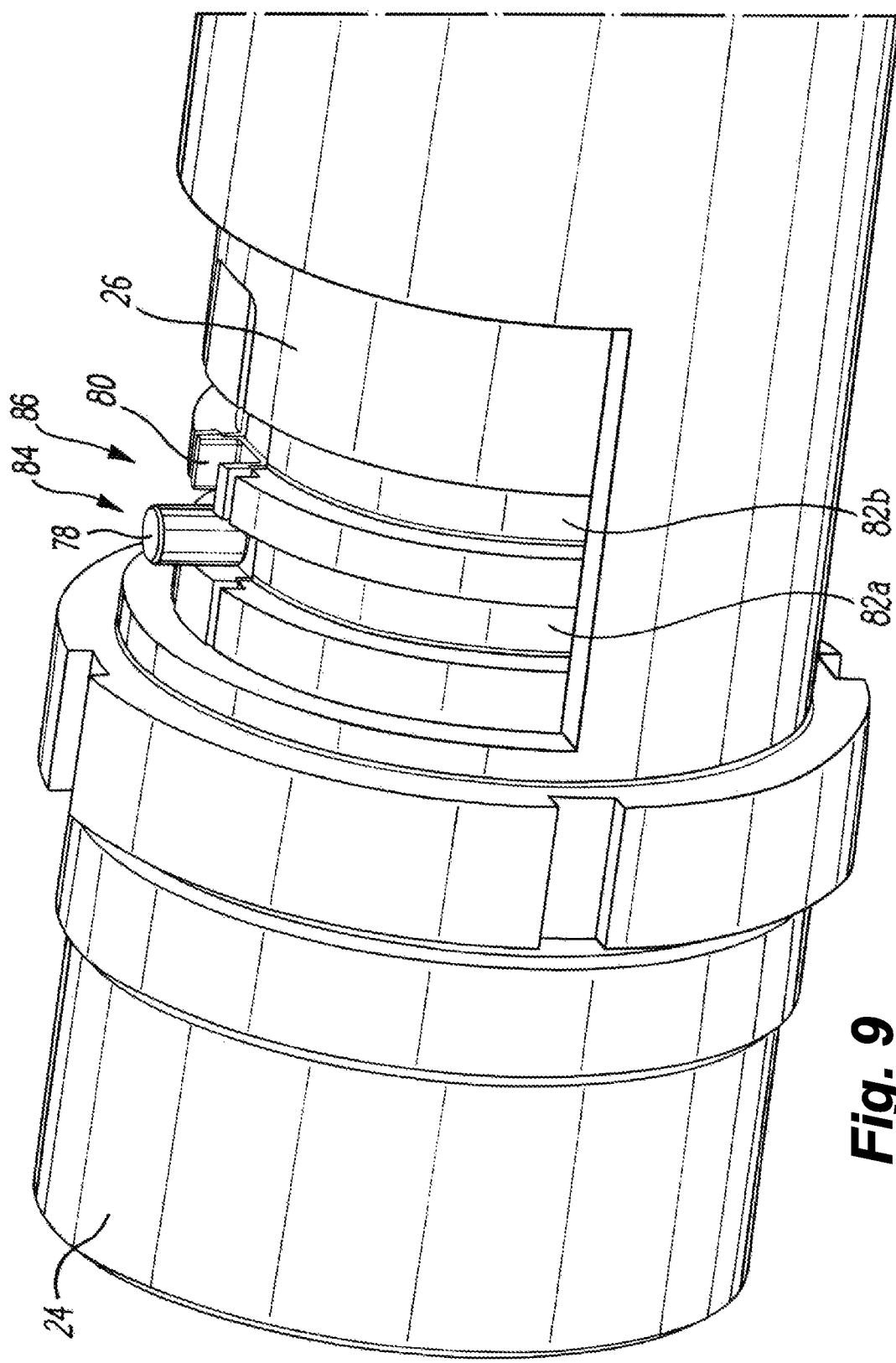
FIG. 9 is a cutaway perspective view of the stroke-limiting assembly of the second embodiment, with the buffer carriage in a first passive configuration.
Figure 10:
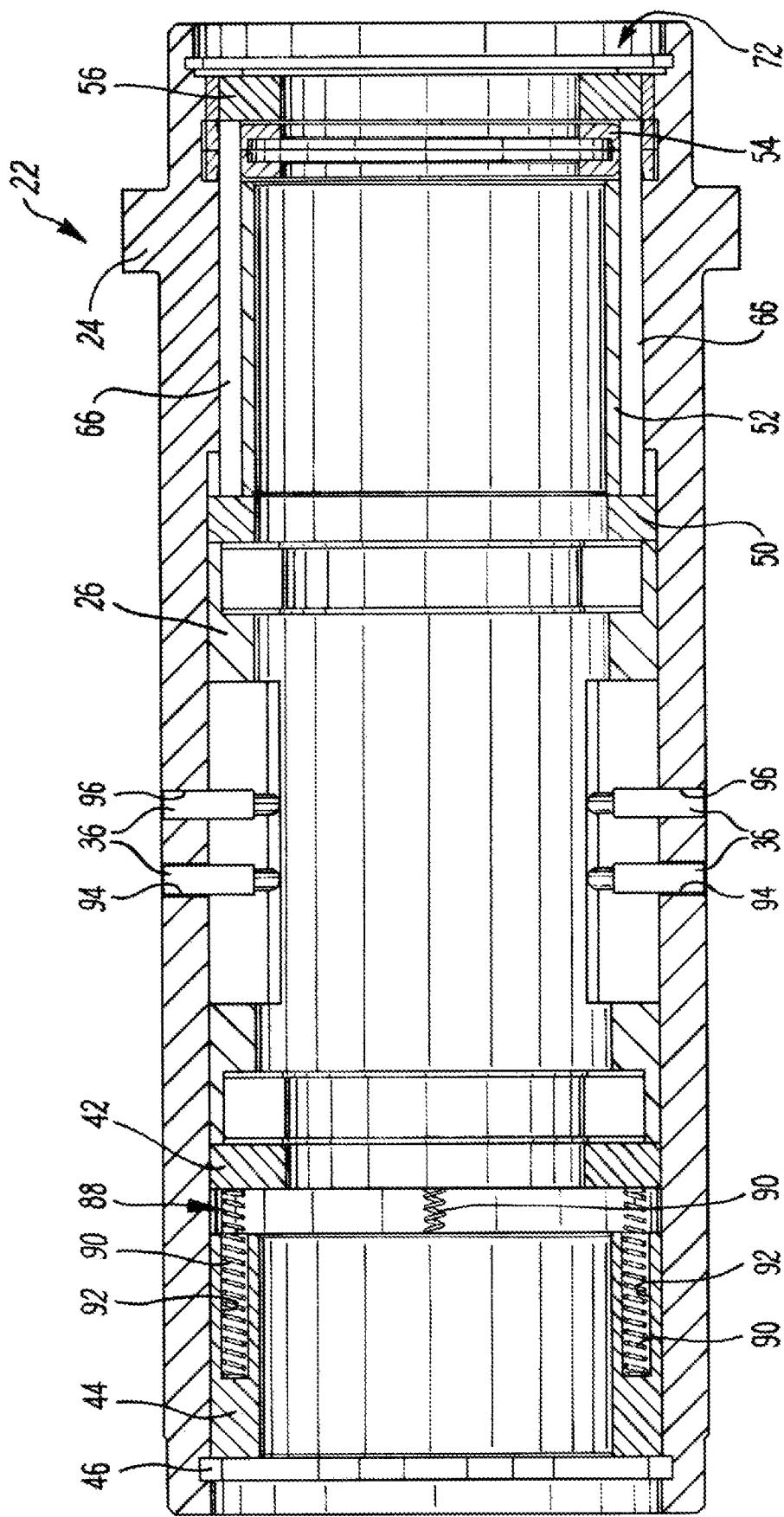
FIG. 10 is a cross-sectional side view of a stroke-limiting assembly according to a third embodiment of the invention, with a buffer carriage in an active configuration

FIGS. 7-9 show a second embodiment of the invention. The second embodiment is similar to the first embodiment, therefore only the differences will be discussed here. The second embodiment does not use deformable shear pins. Instead, the casing 24 has a single pin 78 which is designed not to deform in any usual circumstances (including when the output shaft moves beyond the extended or retracted positions). The pin 78 forms a projection, which is received in an aperture in the form of a short keyway 80 in the outer surface of the rotary portion 26. The rotary portion 26 also has a pair of annular voids in the form of grooves 82a, 82b which run around its outer surface, each positioned substantially circumferentially about the output shaft longitudinal axis and each adjoining the short keyway 80. The buffer carriage 72 of the second embodiment also has a rear washer 83 held in place by the rear circlip 46.

The axial portion of the casing 24 which includes the pin 78 forms a first interlocking portion 84, and the axial portion of the rotary portion 26 which includes the short keyway 80 forms a second interlocking portion 86. When the buffer carriage 72 is in the active configuration, as shown in FIGS. 7 and 8, the pin 78 is received within the short keyway 80. In other words, the first and second interlocking portions 84, 86 are interlocked. The lateral walls of the short keyway 80 prevent the rotary portion 26 from rotating relative to the housing, and therefore linear movement of the output shaft 14 can take place as described previously.

If the output shaft 14 is driven forwards (to the right in FIGS. 7-9) beyond the extended position with relatively little force, the resistance to motion offered by the plain bearings 44, 52 and the front washer is sufficient to stop the output shaft. However, if the output shaft 14 is driven forwards with sufficient force, the rotary portion 26, front plain bearing 52, stop rings 42, 56, force transfer pins 66, lubricating pads 48 and thrust washer 50 are moved axially forwards relative to the casing 24 under action of the first abutment surfaces (74 in FIG. 5) and the front washer 60 is deformed, as described in relation to the first embodiment. This axial movement moves the rotary portion 26 relative to the pin 78, so that the pin projects into the rear groove 82a rather than into the short keyway 80. The first and second interlocking portions 84, 86 are then no longer interlocked, and the rotary portion 26 is free to rotate with the groove 82a acting as a circumferential runway for the pin 78. At this point, the buffer carriage 72 is in the first passive configuration, as shown in FIG. 9. With the rotary portion 26 rotatable about the output shaft longitudinal axis, surplus energy which could otherwise cause damage can be directed into producing rotary motion of the output shaft 14, as described previously.

Similarly, if the output shaft 14 is driven backwards beyond the retracted position with sufficient force while the buffer carriage 72 is in the active configuration, the rotary portion 26, front plain bearing 52, stop rings 42, 56, force transfer pins 66, lubricating pads 48 and thrust washer 50 are moved axially backwards relative to the casing 24 under action of the second abutment surface 76 and the rear washer 83 is deformed.

This moves the rotary portion 26 relative to the pin 78, so that the pin projects into the front groove 82b rather than into the short keyway 80. Again, the first and second interlocking portions 84, 86 are then no longer interlocked, and the rotary portion 26 is free to rotate with the groove 82b acting as a circumferential runway for the pin 78. At this point, the buffer carriage 72 is in the second passive configuration and again, surplus energy which could otherwise cause damage can be directed into producing rotary motion of the output shaft 14.

It is noteworthy that in the second embodiment, force dissipation during movement of the buffer carriage 72 from the active configuration to the first or second passive configuration is limited to movement of the plain bearings 44, 52 and deformation of the front washer 60 or rear washer 83. The lack of shear pins in need of replacement also makes it easier to reset the actuator assembly after the buffer carriage 72 has been moved from the active configuration. This will be discussed in more detail below.

FIGS. 10-13 show a third embodiment of the invention. The third embodiment is also similar to the first embodiment, therefore again only the differences therewith will be discussed here. In the third embodiment, there is an axial gap 88 between the rear plain bearing 44 and the rear stop ring 42. The rear plain bearing 44 has four circumferentially-spaced coil springs 90 received in blind bores 92, each of which runs across the gap 88 and abuts the rear stop ring 42. The springs 90 are held compressed between the ends of the blind bores 92 and the rear stop ring 42. The presence of the gap 88 allows less precise tolerances to be used in relation to the axial length of the components of the buffer carriage 72, as variations in the length of the components of the buffer carriage can be accommodated by the gap. The springs 90 urge the rear plain bearing 44 and the remaining components of the buffer carriage 72 apart, ensuring that the presence of the gap 88 does not allow any of the components of the buffer carriage to rattle or axially wander while the buffer carriage is in the active configuration. The third embodiment also differs from the first embodiment in that the force transfer pins 66 pass all the way through the front plain bearing 52, and abut the thrust washer 50.

Figure 11:
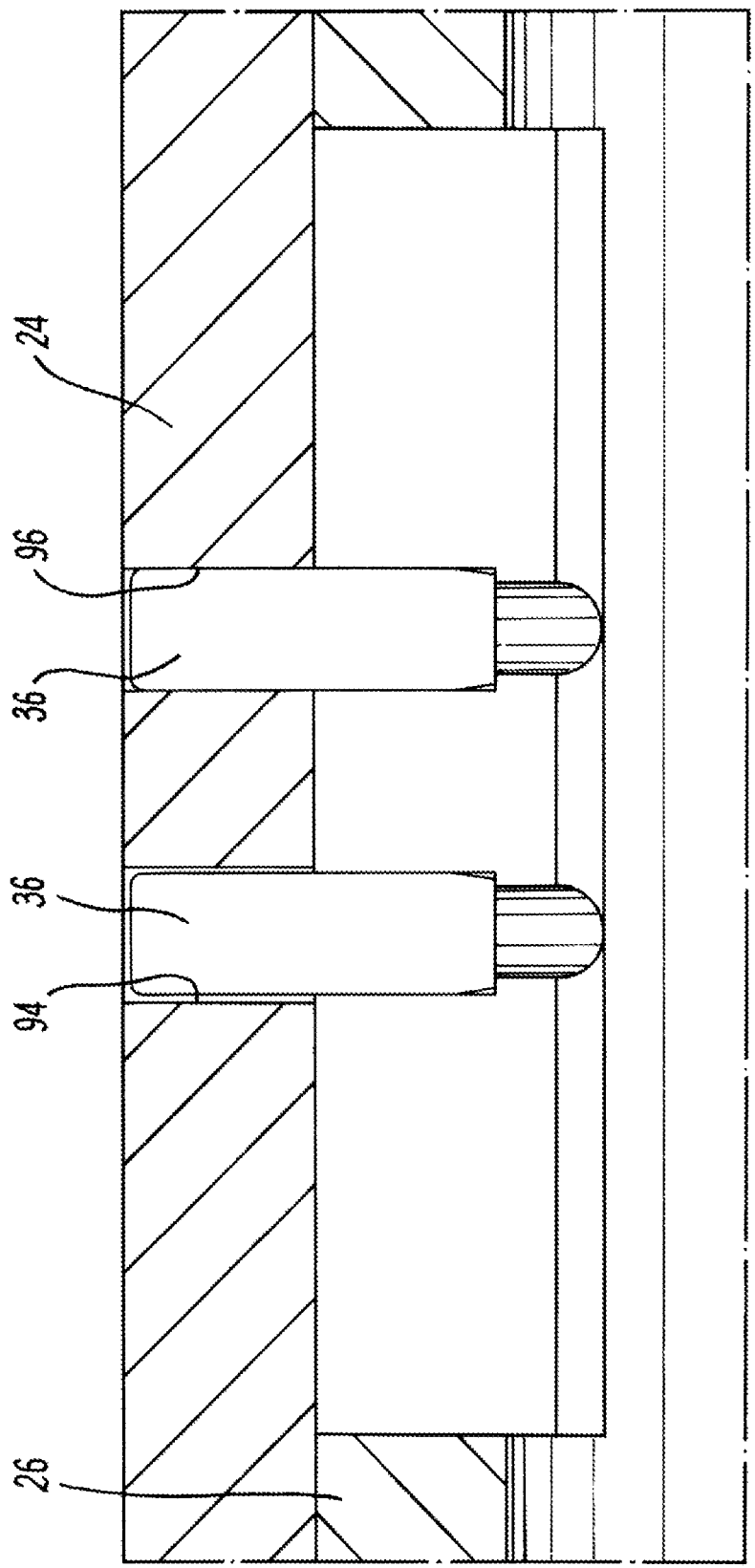
FIG. 11 is an enlarged cross-sectional side view of part of the stroke-limiting assembly of the third embodiment.

In the third embodiment, the casing 24 does not have retainer sections. Instead, the pins are received directly in apertures 94, 96 in the body of the casing 24. FIG. 11 shows a close-up of the apertures 94, 96 at the top (from the perspective of FIG. 10) of the casing 24. This diagram shows more clearly that while one of the apertures 96 takes the form of a circular hole which is sized exhibits a friction fit with the shear pin 36 received therein, the other aperture 94 takes the form of a short slot aligned with the output shaft longitudinal axis. The apertures being arranged in this way allows the deformation of the shear pins 36, during movement of the buffer carriage 72 from the active configuration to the first or second passive configuration, to be staggered. As soon as the rotary portion 26 begins to move axially (in either direction), the shear pin 36 in aperture 96 will begin to deform. However, at this initial stage the shear pin 36 in the slot 94 will simply travel along the length of the slot without deforming. Only when the rotary portion has travelled far enough for the pin 36 to reach the end of the slot 94 will it begin to deform. Similarly, when the rotary portion 26 has moved far enough for the shear pin 36 in aperture 96 to fully fracture, the shear pin in slot 94 will still be in the process of deforming (presuming the shear pins themselves are identical). This staggered deformation absorbs the impact energy over a greater travel distance and reduces the impact forces experienced by the actuator assembly, reducing the likelihood of damage.

Figure 12:
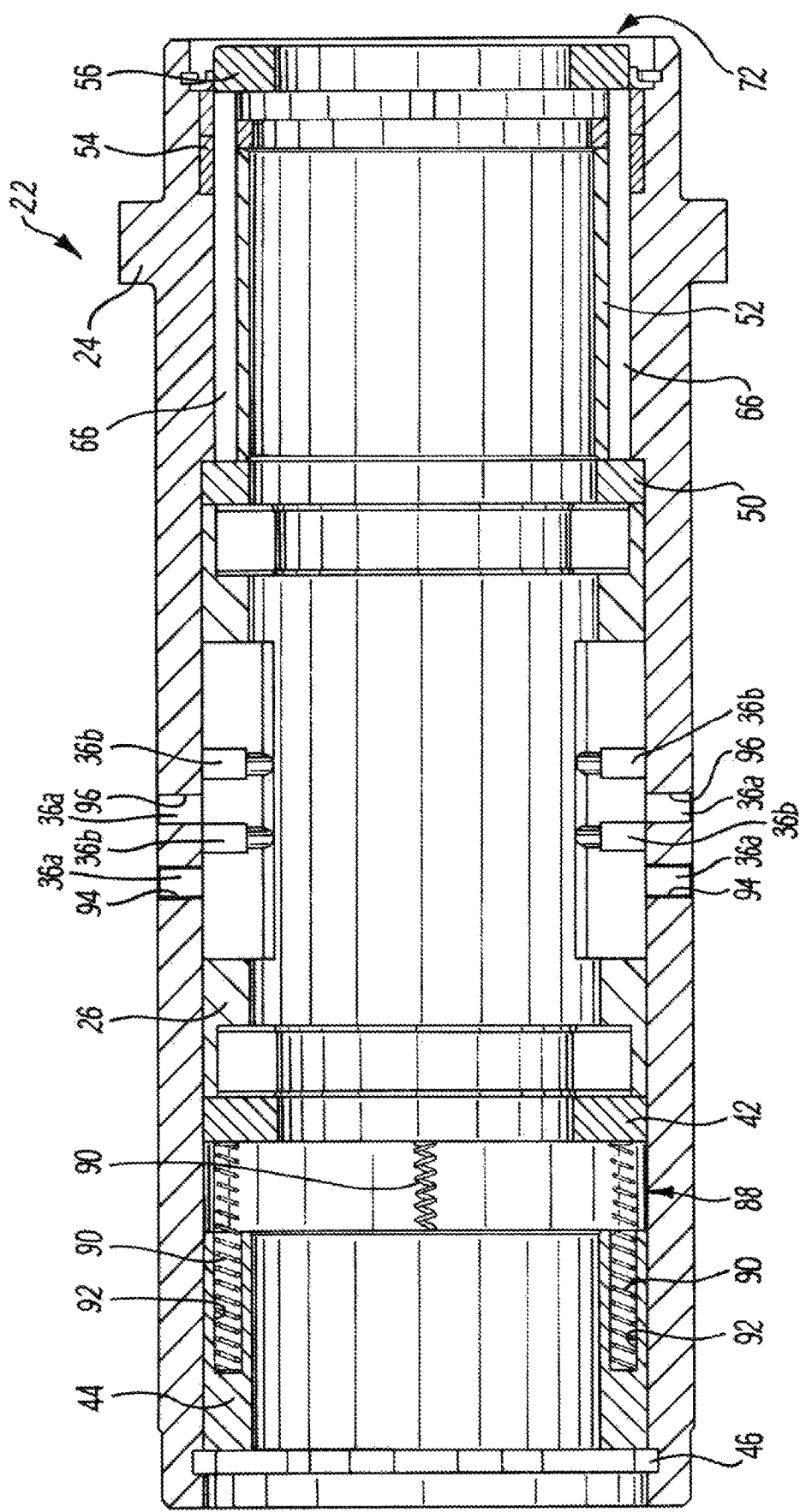
FIG. 12 is a cross-sectional side view of the stroke-limiting assembly of the third embodiment, with the buffer carriage in a first passive configuration.

FIG. 12 shows the stroke-limiting assembly 22 of the third embodiment with the buffer carriage 72 in the first passive configuration. As illustrated in this diagram, movement of the buffer carriage 72 to the first passive configuration involves essentially the same process as those described in relation to the first embodiment. However, while in the first embodiment this movement creates a gap (75 in FIG. 5) between the rear plain bearing and the rear stop ring, in the third embodiment this gap 88 is already present. Movement of the buffer carriage 72 to the first passive configuration therefore increases the axial length of this gap 88, and allows the springs 90 to expand. Further, in this embodiment no axial force is transmitted through the front plain bearing 52. All axial force transmission between the thrust washer 50 and the front stop ring 56 takes place through the force transmission pins 66. That being said, the front plain bearing 52 still moves during movement of the buffer carriage 72 to the first passive configuration (because it abuts the thrust washer 50, which is moved by the rotary portion 26 as described in relation to the first embodiment), and acts to deform the wiper seal 54.

Figure 13:
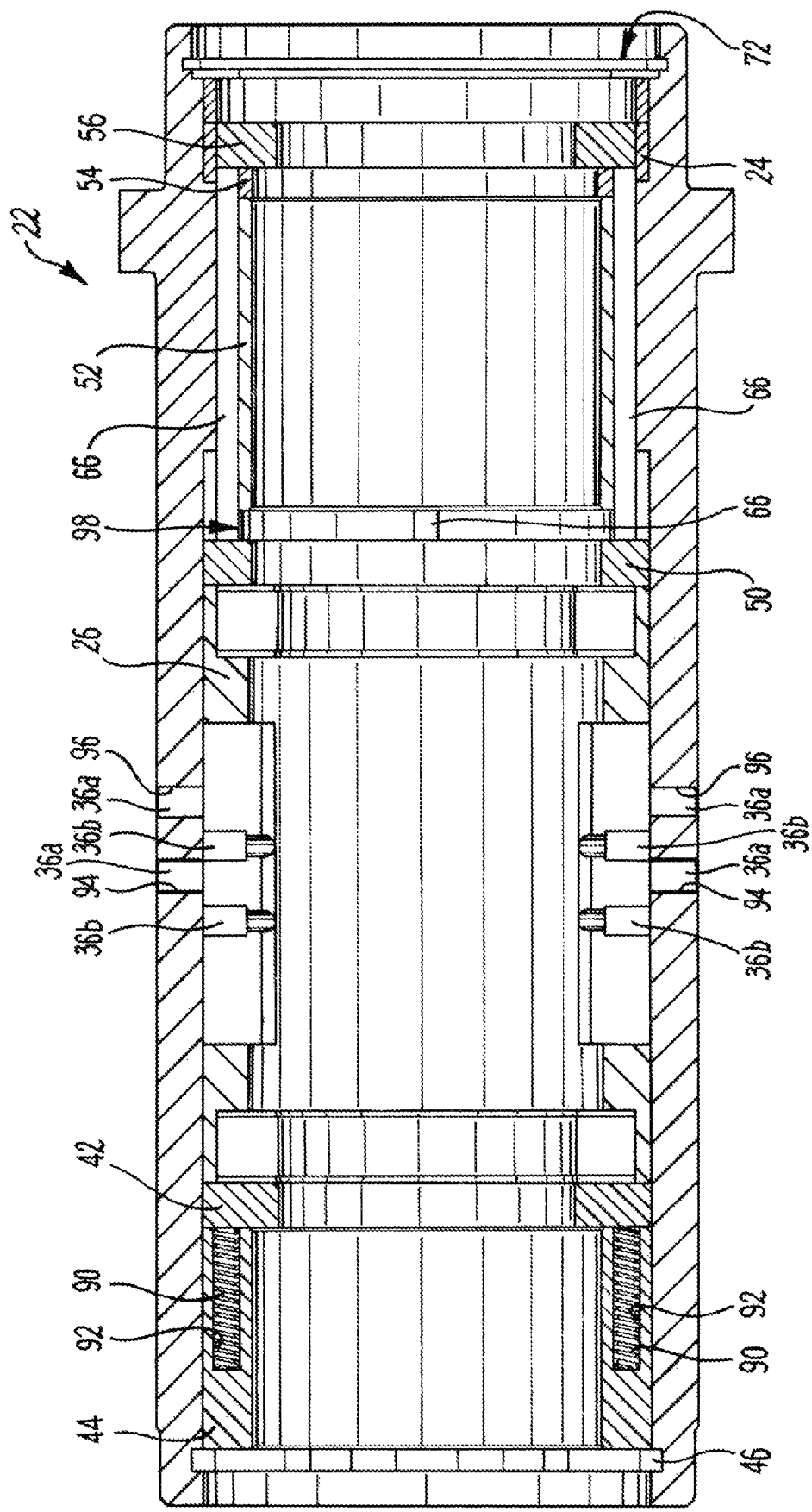
FIG. 13 is a cross-sectional side view of the stroke-limiting assembly of the third embodiment, with the buffer carriage in a second passive configuration.
Figure 14:
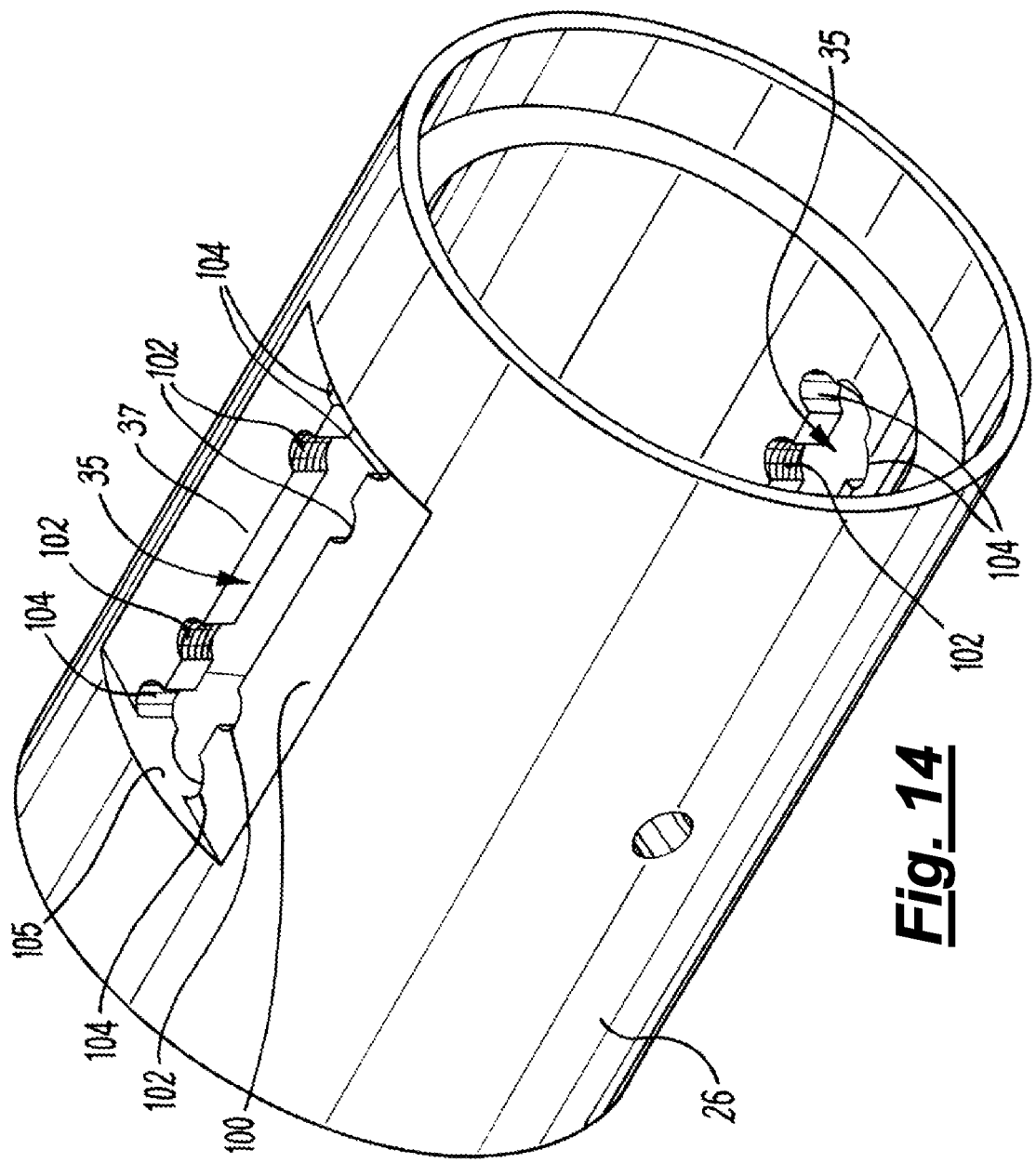
FIG. 14 is a perspective view of a main body of a rotary portion of a buffer carriage.
Figure 15:
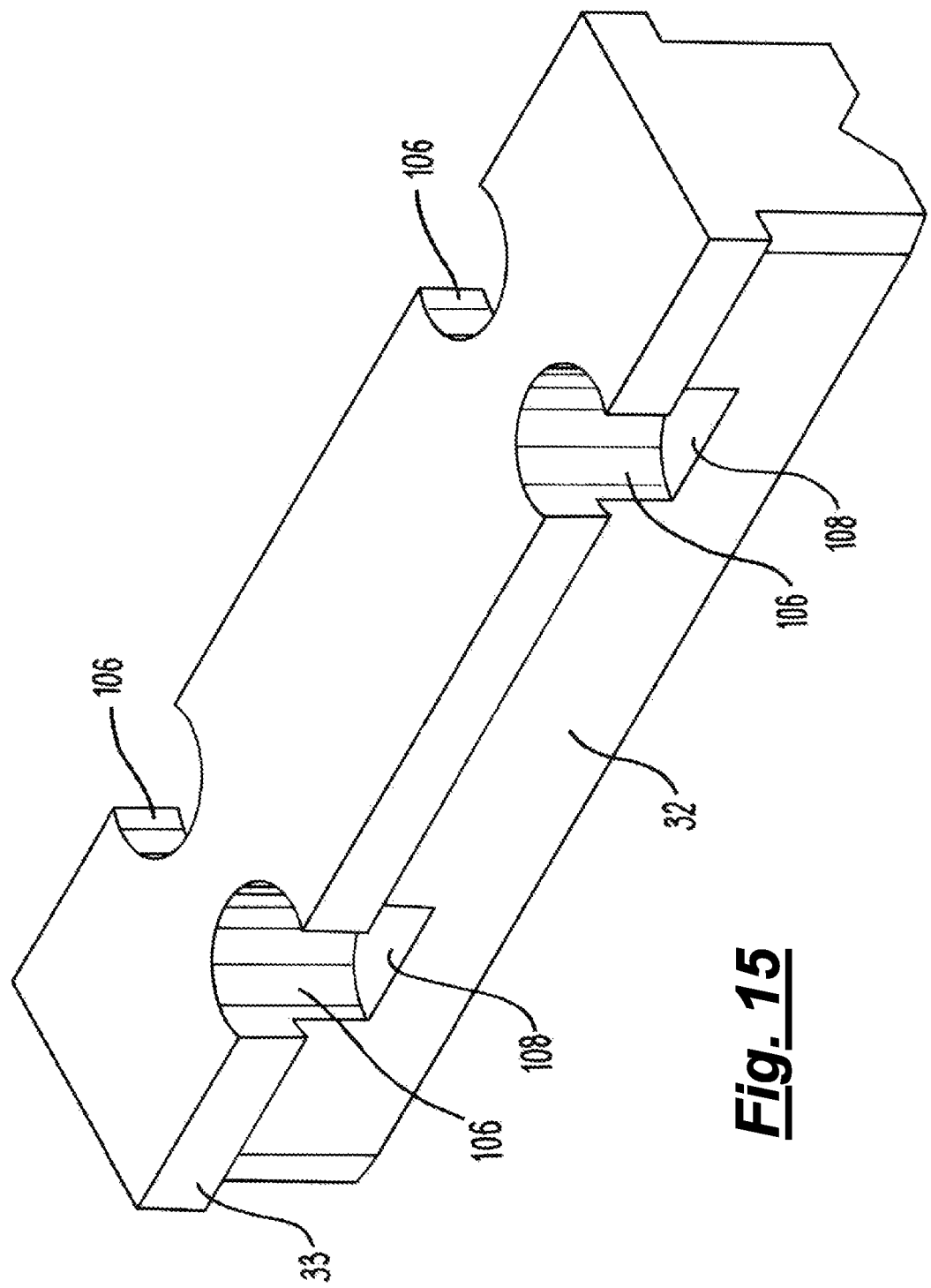
FIG. 15 is a perspective view of a key for receipt in an aperture in the main body of FIG. 14.
Figure 16:
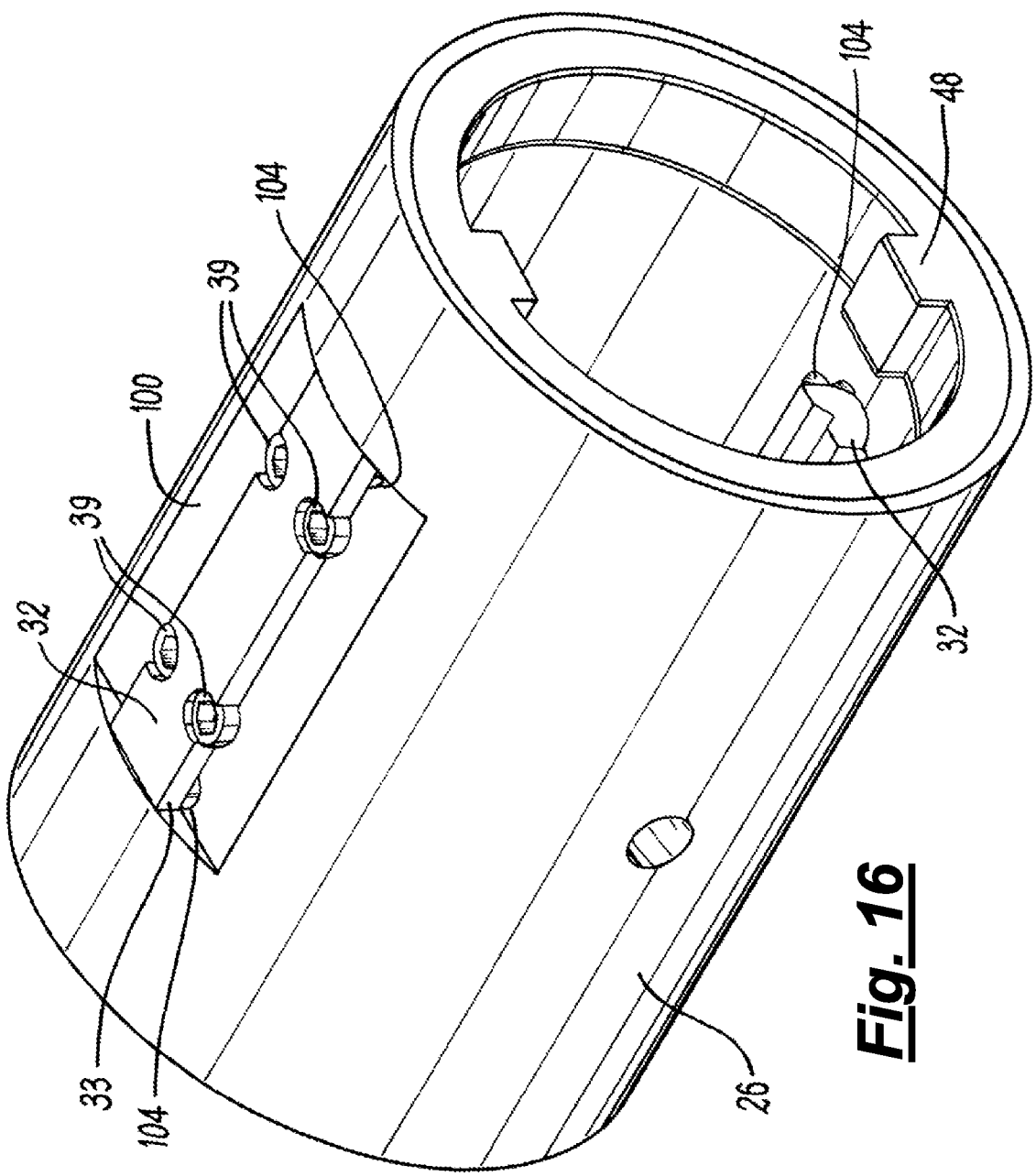
FIG. 16 is a perspective view of a rotary portion comprising the main body of FIG. 14 and two keys of the type shown in FIG. 15.
Figure 17:
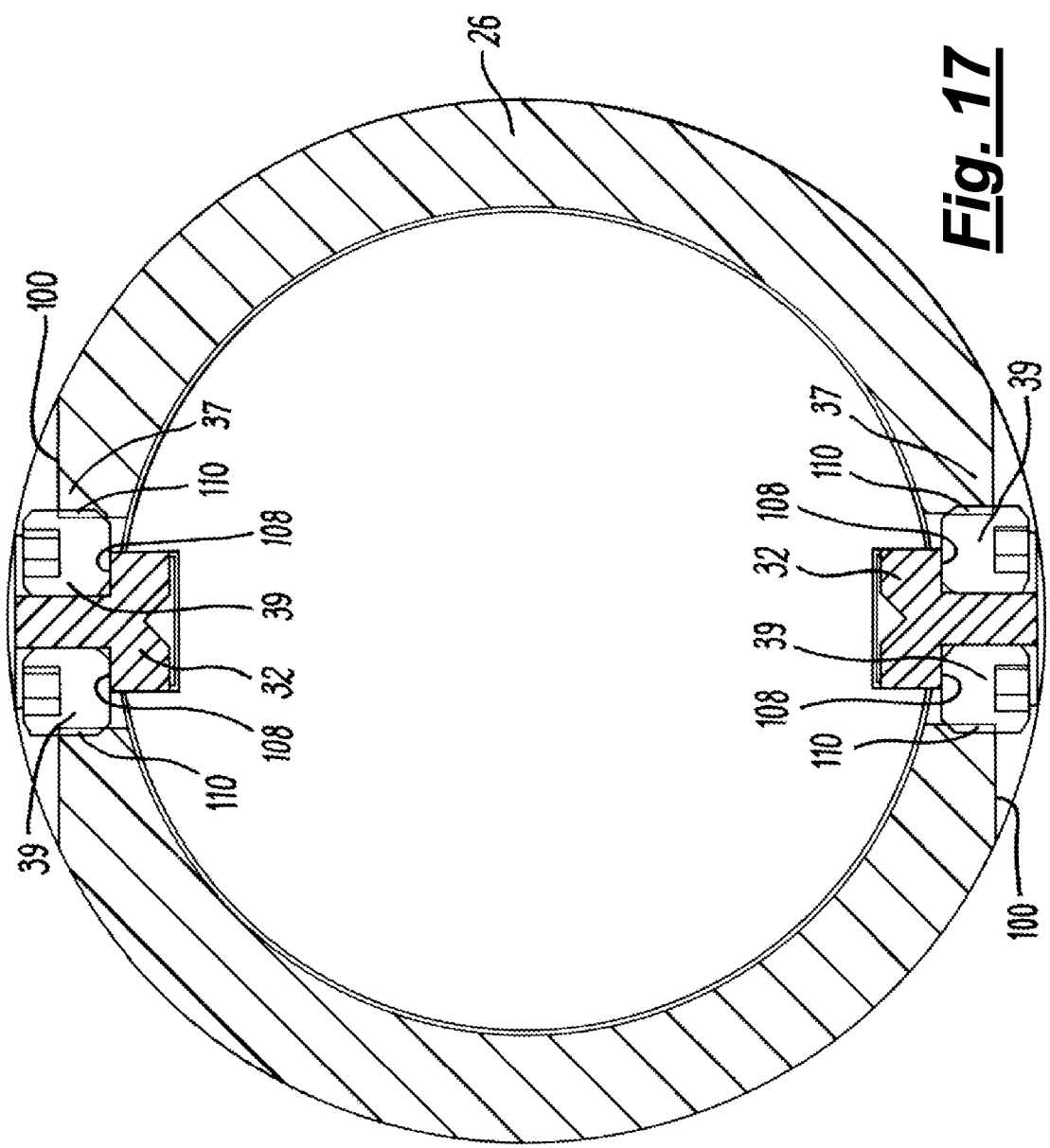
FIG. 17 is a cross-sectional end view of the rotary portion of FIG. 16.

FIG. 13 shows the stroke-limiting assembly 22 with the buffer carriage in the second passive configuration. Again, movement of the buffer carriage 72 to the second passive configuration involves essentially the same process as those described in relation to the first embodiment. In the case of the third embodiment however, the rear plain bearing 44 is not moved axially and the rear circlip 46 is not deformed. Instead, the gap 88 is reduced and the springs 90 are compressed further (this deformation of the springs dissipating some of the energy of the output shaft). The rear circlip 46 and the frictional engagement between the rear plain bearing 44 and casing 24 are of sufficient strength that once the rear stop ring 42 has been moved far enough to abut the rear plain bearing, the output shaft (not visible) cannot move any further backwards. In the third embodiment, rearward movement of the front stop ring 56 is transmitted to the thrust washer 50 by the force transfer pins 66, and is transmitted to the front plain bearing 52 by the wiper seal 54. Since the force transfer pins 66 are not deformed during movement of the buffer carriage 72 to the second passive configuration but the wiper seal 54 is axially compressed, a gap 98 appears between the thrust washer 50 and the front plain bearing 52.

FIGS. 14-17 illustrate a mechanism by which keys 32 can be attached to the remainder of the rotary portion 26. Secure mounting of the keys 32 within the rotary portion 26 is of particular importance in order to minimise the ability of the keys 32 to rock within the apertures 35 during the torsional load experienced by the rotary portion 26, as such rocking can lead to fretting. The key retention mechanism of FIGS. 14-17 corresponds to that used in the first, second and third embodiments, with the exception that the shoulder portions 37 are each provided on machined flats 100.

Each aperture 35 has a plurality of arcuate detents 102, which in this case are each semicircular. Each detent 102 has a screw thread provided thereon. The apertures also have additional arcuate detents 104 which are not threaded. These are formed during manufacture, as a byproduct of machining the distal end faces 105 of the apertures 35, and play no part in attachment of the keys 32.

The keys 32 of this arrangement are identical to those of the first to third embodiments. Each key 32 has a flange 33 as described previously, and a set of arcuate detents 106 (which were not visible in the diagrams relating to the first to third embodiments). Each detent 106 takes the form of a segment of a blind bore, and defines an end face 108.

When a key 32 is inserted into an aperture 35, as described previously its flange 33 abuts the shoulder portion 37 of the aperture, preventing the key from moving radially inwards. With the key 32 in the aperture 35, its arcuate detents 106 are aligned with the arcuate detents 102 of the aperture, co-operatively forming cylindrical bores into which set screws 39 can be inserted. As the detents 102 are threaded, each set screw 39 can be screwed into one of the bores and retained in place by threaded engagement 110 with the thread of the corresponding detent 102 in the aperture 35. The keys 32 are then prevented from moving radially outwards by the end faces 108 of the detents contacting the set screws 39.

The above mechanism is also utilised in the first embodiment for attachment of the retainer portions to the casing. Returning briefly to FIGS. 2-6, threaded arcuate detents (not visible) are provided in the main body of the casing 24, and arcuate detents (not visible) each in the form of a segment of a blind bore are provided in the retainer portions 38. Set screws 40 are received in the cylindrical bores co-operatively formed by the arcuate detents, and prevent the retainer portions 38 moving radially outwards. Unlike the keys 32, the retainer portions 38 have no flanges. Instead, they are prevented from moving radially inwards by contact with the rotary portion 26. Indeed, in some embodiments they may be clamped against the rotary portion 26 by the set screws 40, so as to dissipate energy through frictional resistance if the rotary portion is moved axially and/or rotationally.

Figure 18:
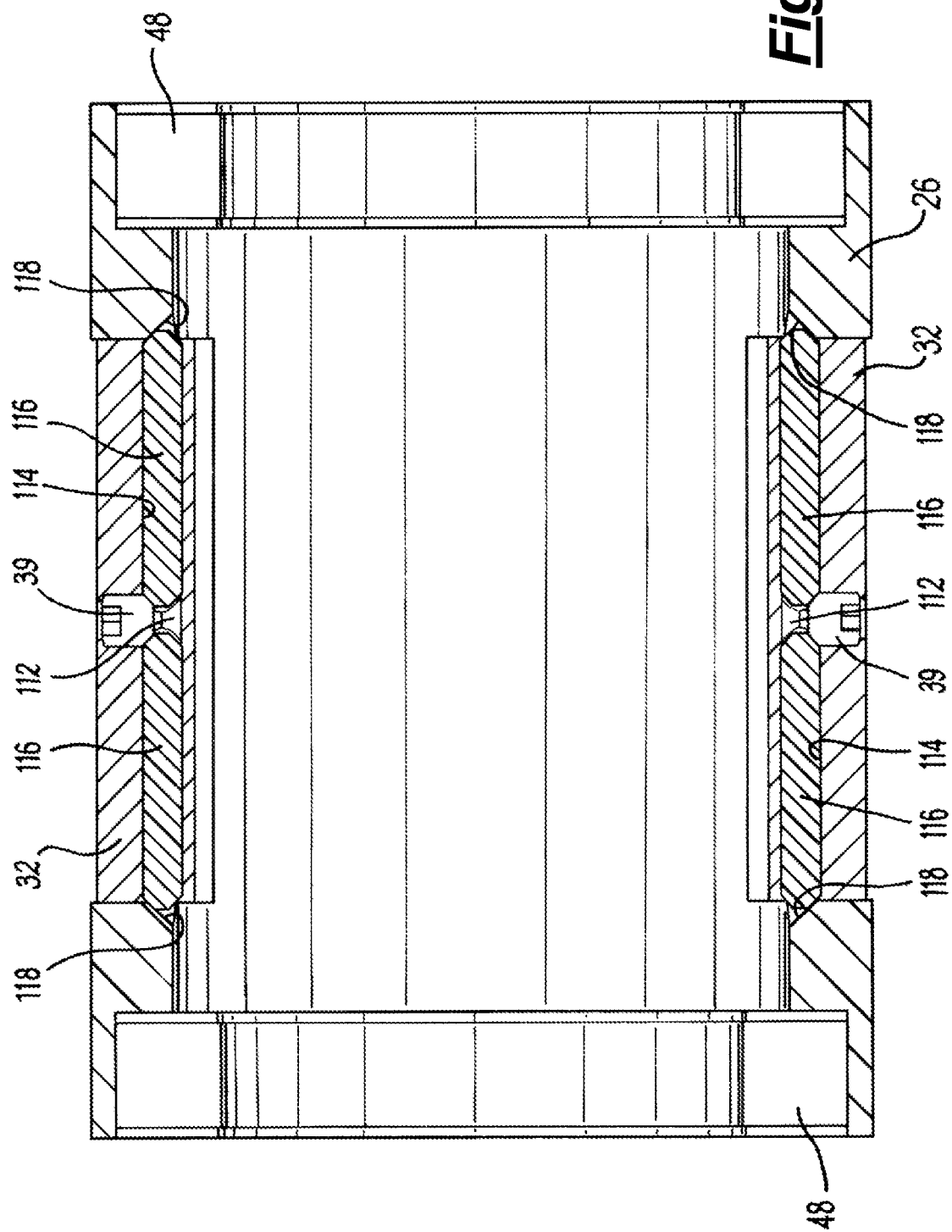
FIG. 18 is a cross-sectional side view of another rotary portion.

FIG. 18 illustrates another mechanism for retaining the keys 32 within the rotary portion 26. In this arrangement, each key 32 has a single set screw 39, positioned within a centrally-positioned radially-aligned threaded bore 112 in the key. The threaded bore 112 intersects a longitudinally-aligned bore 114 within which two retention pins 116 are received. Inclined surfaces 118 are provided on the longitudinally distal ends of each aperture 35.

To retain the key 32 in the aperture 35, the set screw 39 is tightened so as to move it deeper into the threaded bore 112. As the set screw 39 emerges into the longitudinally-aligned bore 114, it cams apart the two retention pins 116 so that they project from the key and contact the inclined surfaces 118. Continued tightening of the set screw 39 forces the retention pins 116 further out from the key 32, against the inclined surfaces so that the inclined surfaces cam the retention pins (and thus the entire key) radially inwards.

When the key 32 has moved radially inwards to the point that its flange (not visible) abuts the shoulder portion (not visible) as described previously, the key 32 is secured.

Figure 19:
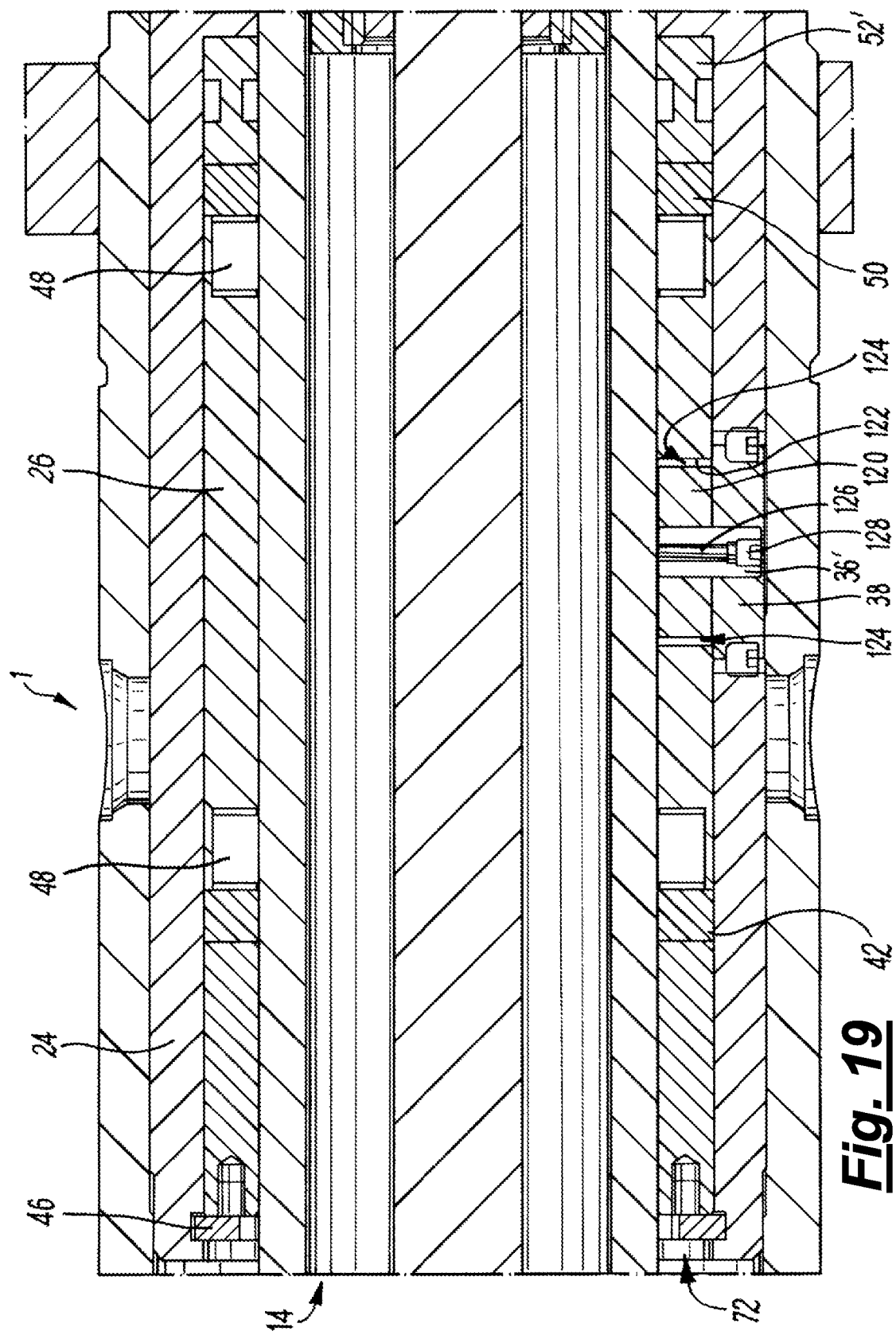
FIG. 19 is a cross-sectional side view of part of a linear actuator assembly according to a fourth embodiment of the invention.
Figure 20:
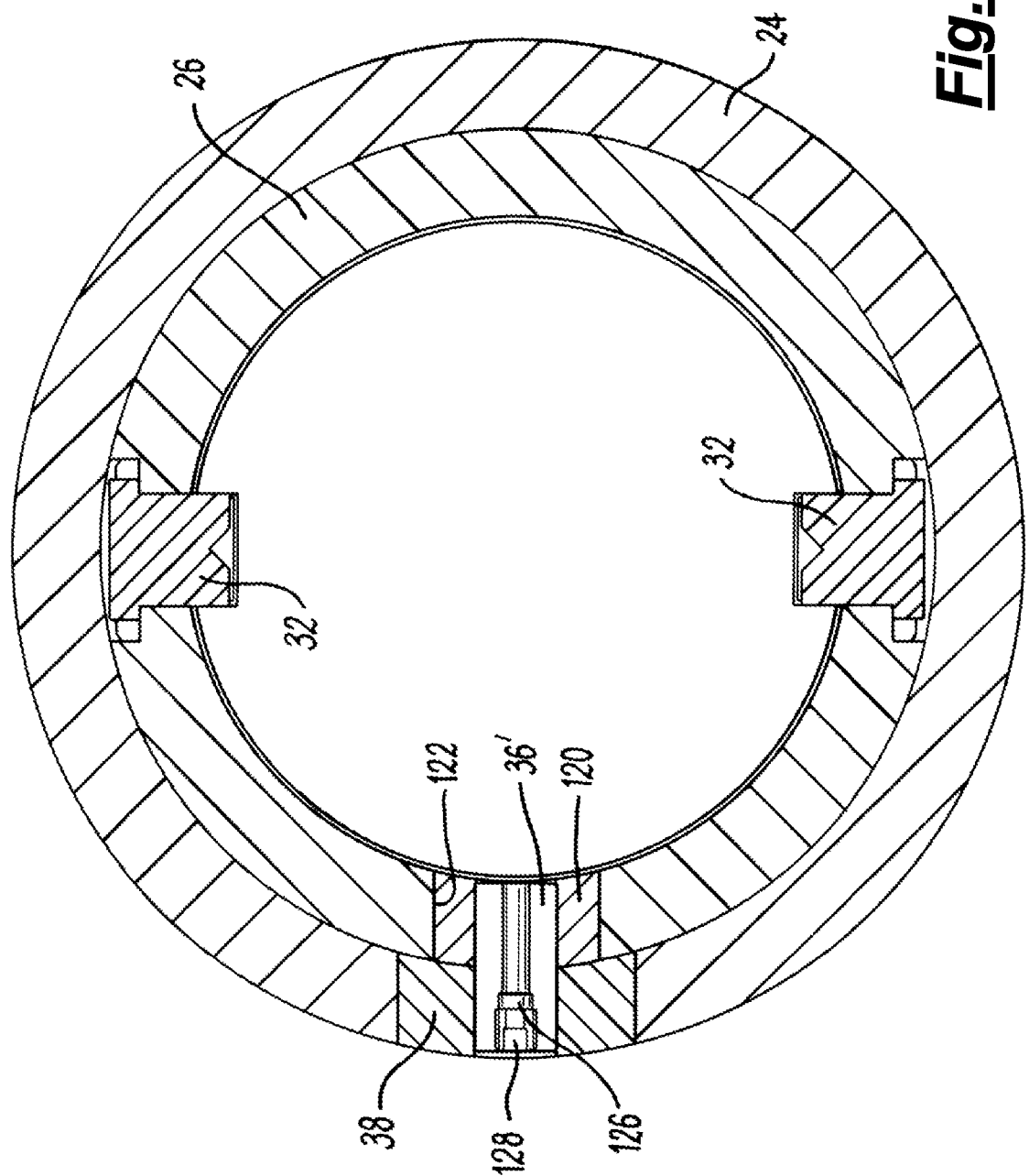
FIG. 20 is a cross-sectional end view of a stroke-limiting assembly of the fourth embodiment.
Figure 21:
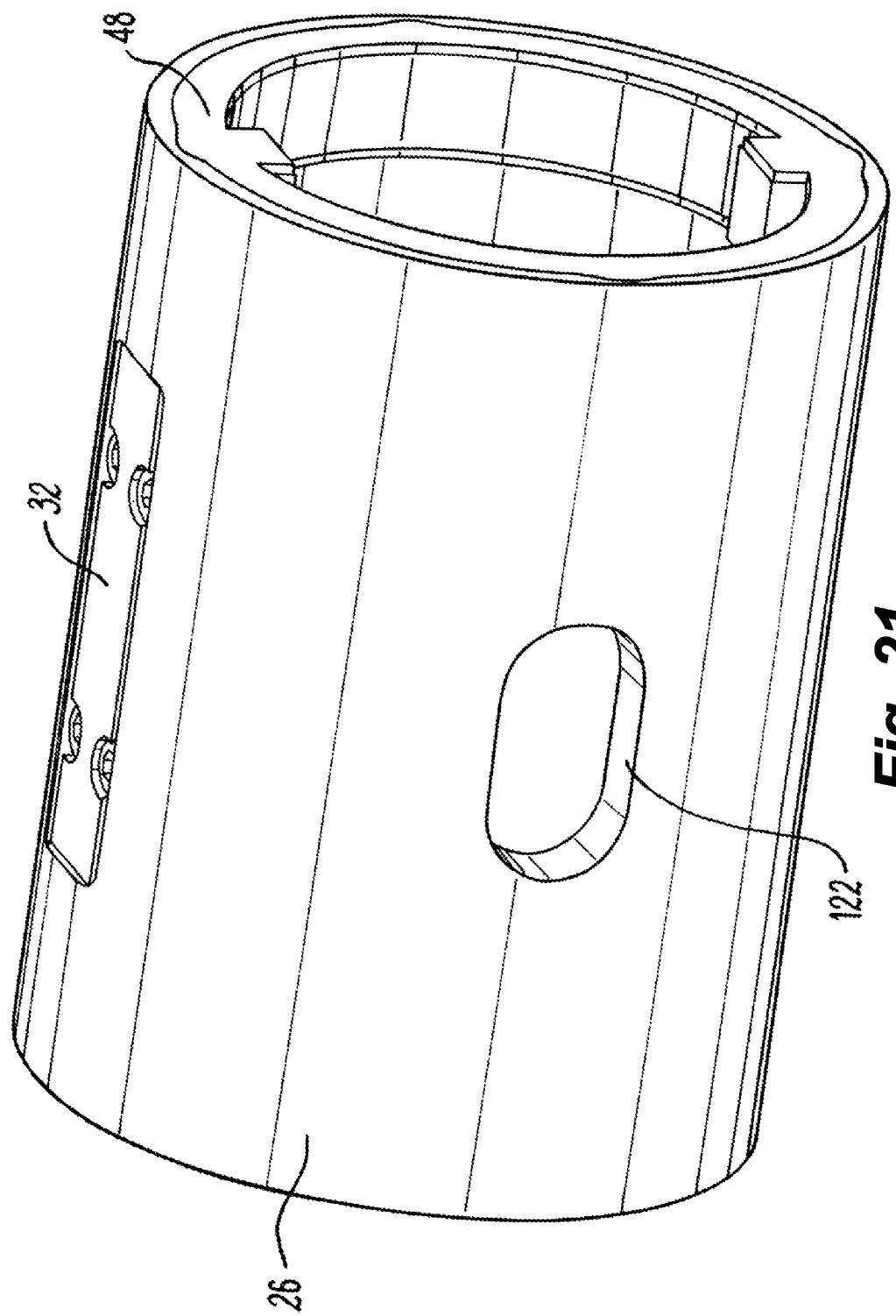
FIG. 21 is a perspective view of part of a rotary portion of the fourth embodiment.

FIGS. 19-21 illustrate a fourth embodiment of the invention. Unlike the first to third embodiments, the mechanism by which the rotary portion 26 of the fourth embodiment is rotationally coupled to the casing 24 (when the buffer carriage 72 is in the active configuration) does not include the keys 32. In this embodiment the rotary portion includes a flat-sided oval plug section 120, received within a complementarily-shaped recess 122. Although the recess 122 is of complimentary shape to the plug section 120, it is slightly axially longer so as to provide an axial clearance 124 at either end of the plug section.

The plug section 120 is connected to the casing 24 (in this case a retainer section 38 thereof) by a shear pin 36', which functions in the same way as the shear pins of the first and third embodiments. In summary, the shear pin 36' rotationally couples the rotary portion 26 and casing 24 when the buffer carriage 72 is in the active configuration but deforms and fractures, allowing the rotary portion to rotate, if sufficient axial force is applied to the buffer carriage 72 by the output shaft 14. The shear pin 36' of this embodiment has a through bore 126, through which lubricant can be injected into the stroke-limiting assembly 22. The through-bore 126 is sealable with a set screw 128 to prevent egress of lubricant and/or ingress of dirt.

Unlike the first, second and third embodiments, the buffer carriage 72 of the fourth embodiment cannot be moved to a second passive configuration. It can only be moved from the active configuration (as shown in FIGS. 19-21) to a first passive configuration, in this case by the output shaft 14 moving beyond the extended position. Although such an arrangement may only protect the actuator assembly from damage caused by overtravel of the output shaft 14 in one direction, this may allow the stroke-limiting assembly to be of simpler construction. For instance, this embodiment does not include a front stop ring or force transfer pins. Further, due to the lack of requirement for it to transmit force from a rearward impact from the output shaft 14, the front plain bearing takes the form of an energy absorbing buffer 52 which is made of resilient material. This, in turn, allows the buffer carriage to be 'pre-loaded' by urging it axially forwards (slightly compressing the buffer 52') before securing it in place with the rear circlip 46. The axial clearance 124 between the plug section 120 and the recess 122 ensures that this pre-loading can take place, as if the plug section and recess were a precise fit then the axial position of the plug section, rather than the axial position of the rear circlip 46, would determine the axial position of the rotary portion 26 within the casing 24. Pre-loading the buffer carriage 72 in this way may be beneficial in that it spreads the cyclic load experienced by the buffer carriage during normal reciprocating movement of the output shaft 14, thereby reducing the prevalence of fretting and/or fatigue loading. Further, use of the plug portion 120 prevents any fretting which does occur from taking place at the shear pin 36' (since any relative axial movement which could cause fretting takes place between the plug section 120 and aperture 122, rather than at the pin 36'). By preventing fretting of the shear pin 36' its precise size, and thus the force required to deform it (i.e. the force required to move the buffer carriage 72 to the first passive configuration), remains constant throughout its service life.

Figure 22:
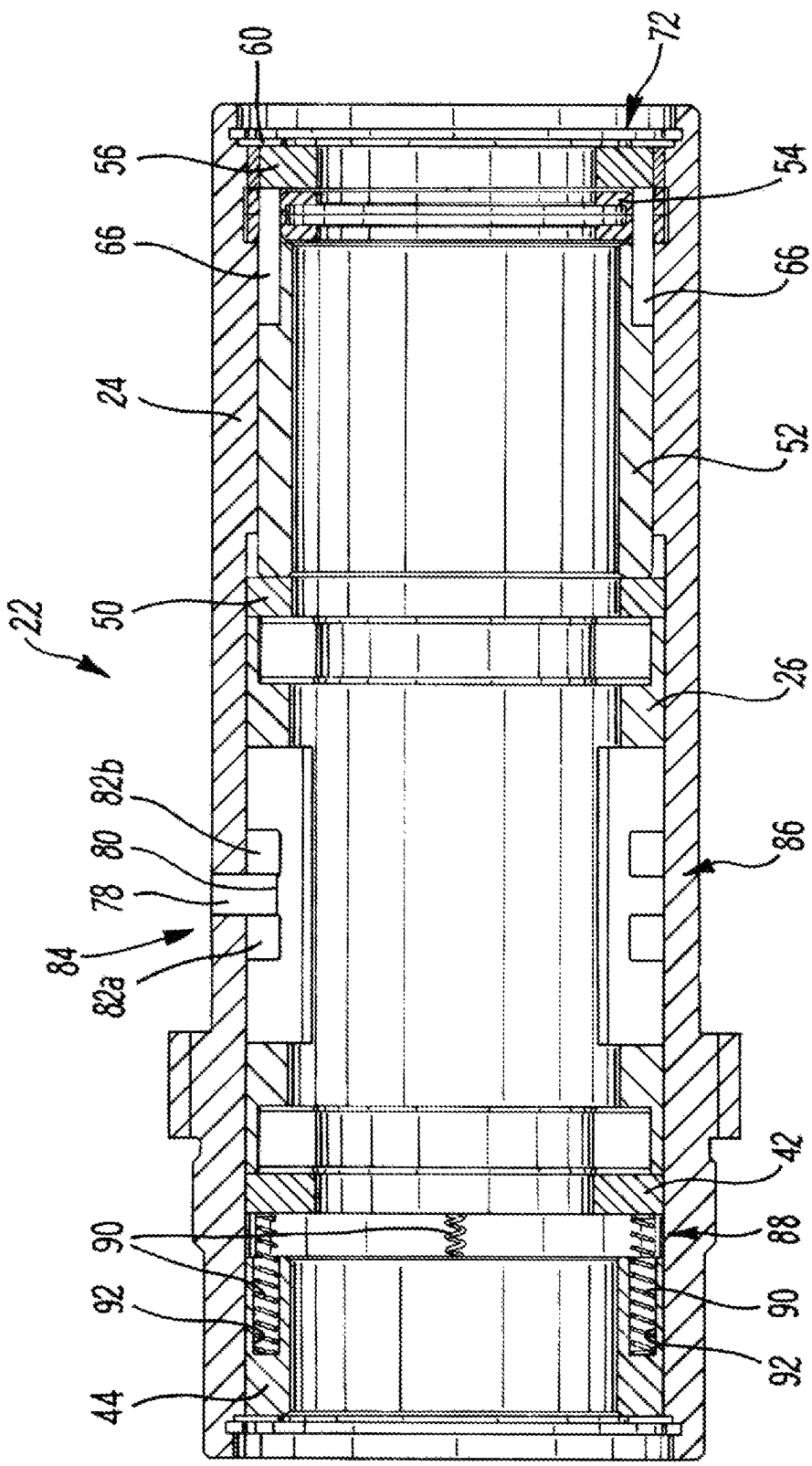
FIG. 22 is a cross-sectional side view of a portion of a linear actuator assembly according to a fifth embodiment of the invention.

As described above, once the buffer carriage of a stroke-limiting assembly has been moved to a passive configuration it may be desirable for the actuator assembly and/or workpiece to be inspected and repaired if necessary. It may therefore be beneficial for a stroke-limiting assembly to be arranged to add complexity to the procedure for resetting the buffer carriage. This could reduce opportunity for the stroke-limiting assembly to be erroneously returned to service before inspection has taken place. FIG. 22 shows a stroke-limiting assembly 22 according to a fifth embodiment of the invention which is so configured, due to the buffer carriage being biased away from the active configuration. The fifth embodiment is similar to the second embodiment, therefore only the differences will be described here.

In the second embodiment the rear stop ring 42 is in contact with the rear plain bearing 44, so that rearward movement of the stop ring displaces the rear plain bearing backwards as described above. In the fifth embodiment however, there is an axial gap 88 between the rear stop ring 42 and the rear plain bearing 44. The rear plain bearing 44 has four circumferentially-spaced coil springs 90 received in blind bores 92, each of which runs across the gap 88 and abuts the rear stop ring 42. The springs 90 are held compressed between the ends of the blind bores 92 and the rear stop ring 42. This arrangement is similar to that described in relation to the third embodiment of the invention. As described in relation to the third embodiment, the presence of the gap 88 allows less precise tolerances to be used in relation to the axial length of the components of the buffer carriage 72, as variations in the length of the components of the buffer carriage can be accommodated by the gap.

Movement of the buffer carriage 72 to the first passive position (i.e. forwards, to the right in FIG. 22) takes place in the same way as described in relation to the second embodiment. Movement of the buffer carriage 72 to the second passive position takes place in a similar fashion to the second embodiment except that the rear plain bearing 44 is not displaced. Instead, the buffer carriage 72 moves backwards towards the rear plain bearing 44, the size of the axial gap 88 is reduced and the springs 90 are compressed, as described in relation to the third embodiment.

As also described in relation to the third embodiment, the springs 90 urge the rear plain bearing 44 and the remaining components of the buffer carriage 72 apart, ensuring that the presence of the gap 88 does not allow any of the components of the buffer carriage 72 to rattle or to wander backwards while the buffer carriage is in the active configuration. In this embodiment, the springs 90 perform the additional function of urging the buffer carriage 72 away from the active configuration (in this case towards the first passive position), thereby making it more difficult for the buffer carriage 72 to be reset (by interlocking the first and second interlocking portions 84, 86 again). As such, it is less likely for the stroke-limiting assembly 22 to be returned to service prematurely (for instance by an operator who is keen to avoid down-time and does not understand the potential risks of the stroke-limiting assembly 22 not having been inspected).

Figure 23:
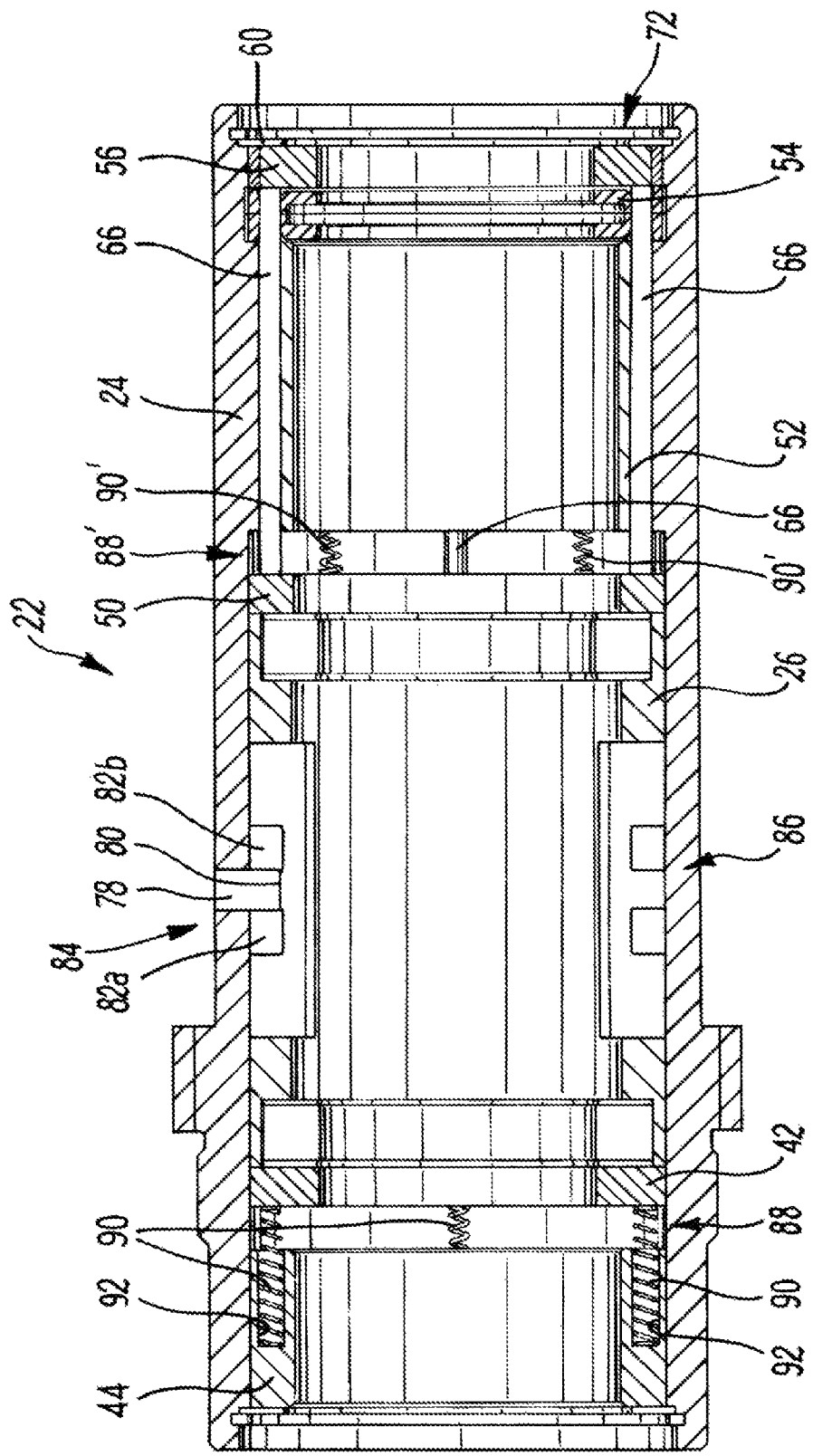
FIG. 23 is a cross-sectional side view of a portion of a linear actuator assembly according to a sixth embodiment of the invention.

Although in some situations it can be preferable for the buffer carriage of a stroke-limiting assembly to be more difficult to reset, in other circumstances it may be preferable for resetting to be as quick and straightforward as possible. For instance, where an operator is sufficiently well trained that they can carry out the necessary inspection themselves, mitigating the risk of a stroke-limiting assembly being returned to service prematurely, it may be advantageous to make the resetting operation as simple as possible so as to reduce machine down time. FIG. 23 shows a stroke-limiting assembly 22 of a sixth embodiment of the invention which incorporates features to assist in the resetting process. More specifically, the buffer carriage 72 is biased towards the active configuration. The sixth embodiment is similar to the fifth embodiment therefore only the differences will be described here.

As well as an axial gap 88 between the rear stop ring 42 and the rear plain bearing 44, this embodiment has an additional axial gap 88' between the thrust washer 50 and the front plain bearing 52. Further, the front plain bearing 52 has four circumferentially-spaced coil springs 90' received in blind bores (not visible), each of which runs across the gap 88' and abuts the thrust washer 50. In addition, in the sixth embodiment the force transfer pins 66 pass all the way through the front plain bearing 52. They run from the front stop ring 56, through the front plain bearing 52 and across the gap 88', and abut the thrust washer 50.

Movement of the buffer carriage 72 to the second passive position (i.e. backwards, to the left in FIG. 23) takes place in the same way as described in relation to the fifth embodiment. Movement of the buffer carriage 72 to the first passive position takes place in a similar fashion to the fifth embodiment (and indeed the second embodiment) except that the front plain bearing 52 is not displaced. Instead, forward movement of the thrust washer 50 is transmitted through the force transfer pins 66. These push the front stop ring 42 forwards, deforming the front washer 60, while the front plain bearing 52 remains stationary and size of the gap 88' is reduced.

As described previously, the springs 90 urge the rear plain bearing 44 and the remaining components of the buffer carriage 72 apart, ensuring that the presence of the gap 88 does not allow any of the components of the buffer carriage 72 to rattle or wander backwards while the buffer carriage is in the active configuration. Similarly, the springs 90' ensure that the presence of the gap 88' does not allow any of the components of the buffer carriage 72 to rattle or to wander forwards.

Although in the fifth embodiment the springs 90 urge the buffer carriage 72 away from the active configuration, thereby making it more difficult for the buffer carriage to be reset back in the active configuration, in the sixth embodiment the springs 90 and the springs 90' act to bias the buffer carriage 72 towards the active configuration. In this case, the buffer carriage 72 is biased towards the active configuration from the first passive configuration by the springs 90', is biased towards the active configuration from the second passive configuration by the springs 90. If the rear stop ring 42 is moved forwards (to the right in FIG. 23) by the output shaft (not visible), moving the buffer carriage 72 towards the first passive configuration, gap 88 increases and gap 88' decreases in length. As a result, the springs 90' become compressed and consequently provide a restorative force which acts to urge the thrust washer 50 backwards to return the buffer carriage 72 to the active configuration. Similarly, if the front stop ring 56 is moved backwards by the output shaft (not visible), moving the buffer carriage 72 towards the second passive configuration, gap 88' increases and gap 88 decreases in length. As a result, the springs 90 become compressed and consequently provide a restorative force which acts to urge the rear stop ring 42 forwards to return the buffer carriage 72 to the active configuration. The buffer carriage being biased towards the active configuration in this way provides assistance to the user when resetting the buffer carriage 72, making this process quicker and less time consuming.

In this embodiment, if the output shaft (not visible) contacts the front stop ring 56 and begins moving it backwards, moving the buffer carriage 72 towards the second passive configuration, the front plain bearing 52 does not move. Instead, the front stop ring 56 moves towards the front plain bearing 52 and compresses the wiper seal 54, and the force transfer pins 66 force the thrust washer 50 to move back away from the front plain bearing 52. Compression of the wiper seal 54 may be beneficial in that its radially innermost portion is forced further radially inwards as it is flattened. This presses the wiper seal 54 against the output shaft (not visible), increasing the friction between the output shaft and the wiper seal. This, in turn, assists in the dissipation of energy. Further, the increased frictional resistance may be detected by a controller and act as an alert that overtravel of the output shaft (not visible) is taking place.

In this embodiment, each of the springs 90, 90' is at its natural length when the buffer carriage 72 is in the active configuration, the springs 90 are not fixed to the rear stop ring 42 and the springs 90' are not fixed to the thrust washer 50. As such, if gap 88 increases in length the springs 90 no longer remain in contact with the rear stop ring 42, and if gap 88' increases in length the springs 90' no longer remain in contact with the thrust washer 50. In one modification of the fifth embodiment, each of the springs 90 is fixed at its rear end to the rear plain bearing 44 and fixed at its front end to the rear stop ring 42, and each of the springs 90' is fixed at its rear end to the rear plain bearing 44 and fixed at its front end to the rear stop ring 42. In this arrangement, movement of the buffer carriage 72 towards the first passive configuration not only compresses the springs 90' but also stretches the springs 90, and similarly movement of the buffer carriage 72 towards the second passive configuration not only compresses the springs 90 but also stretches the springs 90'. The restorative force acting to bias the buffer carriage 72 towards the active position is therefore increased.

In another modification of the fifth embodiment, the springs 90 and/or the springs 90' may not be at their natural length when the buffer carriage 72 is in the active configuration. For instance, with the buffer carriage 72 in the active configuration the springs 90, 90' may each be held in a compressed state. Movement of the buffer carriage 72 towards one of the passive configurations would therefore compress one set of springs 90 or 90', and would allow the other springs to return to (or move nearer to) their natural length. The restorative force from springs 90 and springs 90' when the buffer carriage 72 is in the active position may be equal and opposite, or may be unequal (at which point the buffer carriage would be retained in the active configuration by additional means, such as friction between the pin 78 and the short keyway 80.

It will be appreciated that numerous modifications to the above described design may be made without departing from the scope of the invention as defined by the appended claims. For instance, although the invention has been described herein in relation to actuator assemblies for SPR, it may equally be used in any other suitable application, such as in other types of joining operations (such as clinching), or in actuators for applying loads such as those used on robotic arms. In addition, although the above embodiments describe arrangements where the stroke-limiting assembly is attached to the housing of the actuator, in other embodiments it may be attached to the output shaft. Such an assembly may for example take the form of one of the above embodiments with the radial positions of the components reversed (i.e. 'turned inside out'), with the housing radially innermost, the buffer carriage being concentrically outwards therefrom and the keys projecting radially outwards into keyways in the actuator housing.

Although in the above embodiments only the shear pins have been explicitly described as 'deformable elements', it is to be understood that any element which is deformed during movement of the buffer carriage from the active configuration is also an example of a deformable element. For instance, the front washer of the first embodiment constitutes a deformable element, as does the wiper seal (each of these components also being an example of a deformable element received in annular voids in the support structure and buffer carriage). As another example, the springs of the third, fifth and sixth embodiments also constitute deformable elements (in this case elastically deformable elements).

Although the above embodiments describe the invention in relation to a motor-driven actuator in which an electric motor operates a roller screw mechanism, the invention may equally be used in relation to any other suitable type of actuator. For instance, it may be used in relation to an actuator which uses a hydraulic or pneumatic motor, and/or one which utilises a lead screw mechanism or a ball screw mechanism.

Although the above embodiments have been described in relation to the first passive configuration being the configuration that the buffer carriage reaches when the output shaft is driven beyond the extended position, this should not be construed as limiting. The configuration that the buffer carriage reaches when the output shaft is driven beyond the retracted position may equally be considered to constitute a first passive configuration. Similarly, the configuration that the buffer carriage reaches when the output shaft is driven beyond the extended position may equally be considered to constitute a second passive configuration In the above embodiments, the plain bearings form an interference fit. In other arrangements however, one or more tolerance rings may be positioned between them (or any other suitable component) and the housing. As well as allowing less stringent manufacturing tolerances to be used for the internal diameter of the housing and the external diameter of the bearings, the use of tolerance rings may increase the sliding friction generated by axial movement of the bearings within the housing. This, in turn, would increase the amount of energy generated by this movement and further reduce the amount of energy of a collision which is available to cause damage.

Alternatively, one or more of the plain bearings may be integral with the housing. For instance, the third embodiment may be modified so that the front plain bearing is formed from a narrowed portion of the housing through which the force transfer pins project. In such an arrangement the front plain bearing would be axially fixed. So that the thrust washer would still be able to move forwards when the buffer carriage was moved to the first passive configuration, the axial length of the front plain bearing would be reduced so as to provide a gap in front of the thrust washer into which it could move.

Although in the second embodiment of the invention the projection of the first interlocking portion protrudes radially, in other embodiments it may project in any other suitable direction. For example, it may project longitudinally, in which case the first and second interlocking portions would function as a pair of crown gears.

Although several examples of mechanisms by which keys can be attached to a rotary portion have been described above, any other suitable mechanism may be ustilised. For instance, the keys may be glued, soldered, brazed or welded in place, in addition to or instead of any of the mechanisms described above. Further, different keys may be mounted to a rotary portion via different mechanisms.

In any of the above embodiments, energy dissipation during or after movement of the buffer carriage towards the or a passive configuration may be supplemented by means external to the stroke-limiting assembly. For instance, the axial position of the output shaft may be monitored (for instance via one or more positional encoders) by a control system, and in the event of overtravel of the output shaft the control system may implement an emergency procedure. This procedure may involve engaging an emergency braking system positioned to act on a component such as the output shaft or the first threaded member, and/or causing the motor to rotate the first threaded member in the opposite direction so as to counteract the existing (undesirable) movement of the output shaft.

Although the described embodiments utilise either and interlocking portions or shear pins, in other embodiments these concepts may be combined. For instance, the second embodiment may be modified to include a shear pin projecting from the casing into a void provided by the space in front of the thrust washer and/or a shear pin projecting from the casing into a void provided by the space behind the rear stop ring. The former pin would be deformed by movement of the buffer carriage towards the first passive configuration and the latter pin would be deformed by movement of the buffer carriage towards the second passive configuration. Furthermore, although the buffer carriage being biased towards or away from the active configuration (thereby effecting the ease with which the buffer carriage can be reset) has been described in relation to embodiments which utilise first and second interlocking portions, these ideas may also be applied in relation to other embodiments (such as those which utilise shear pins).

The described and illustrated embodiments are to be considered as illustrative and not restrictive in character, it being understood that only preferred embodiments have been shown and described and that all changes and modifications that come within the scope of the invention as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. For instance, although staggered deformation of deformable elements has only been described in relation to the third embodiment, it is to be understood that other embodiments may also utilise this concept (in relation to shear pins or otherwise). The optional and/or preferred features for each aspect of the invention are also applicable to any other aspects of the invention where appropriate.

The invention claimed is:

1. A linear actuator assembly comprising:
   a linear actuator which has a housing and an output shaft, the output shaft defining an actuator axis and being movable along the actuator axis between an extended position and a retracted position relative to the housing; and
   a buffer carriage arranged in an active configuration in which it is mounted on either the housing or the output shaft, the buffer carriage having a rotary portion, wherein:
the output shaft is rotationally coupled to the rotary portion of the buffer carriage such that rotation of the output shaft about the actuator axis requires corresponding rotation of the rotary portion and such that the output shaft is unable to rotate relative to the rotary portion;
the rotary portion is rotationally restrained when the buffer carriage is in the active configuration;
the one of the housing and output shaft on which the buffer carriage is not mounted has a first abutment surface;
the first abutment surface is positioned to act directly or indirectly on the buffer carriage when the output shaft reaches one of the extended position and the retracted position, such that continued movement of the output shaft beyond said position moves the buffer carriage from the active configuration towards a first passive configuration; and
the rotary portion is rotatable about the actuator axis when the buffer carriage is in the first passive configuration.

2. The linear actuator assembly according to claim 1 wherein:
the one of the housing and output shaft on which the buffer carriage is not mounted has a second abutment surface; and
the second abutment surface is positioned to act directly or indirectly on the buffer carriage when the output shaft reaches the other one of the extended position and the retracted position to the position in which the first abutment surface acts on the buffer carriage, such that continued movement of the output shaft beyond said position moves the buffer carriage from the active configuration to a second passive configuration.

3. The linear actuator assembly according to claim 2 wherein the rotary portion is rotatable about the actuator axis when the buffer carriage is in the second passive configuration.

4. The linear actuator assembly according to claim 1 wherein:
when the buffer carriage is in the active configuration, the rotary portion is axially restrained relative to the one of the housing and output shaft to which it is mounted; and
the buffer carriage is movable from the active configuration to the passive configuration by moving at least the rotary portion along the actuator axis, relative to the one of the housing and output shaft to which it was mounted when in the active configuration, beyond the range of movement to which it was restrained when in the active configuration.

5. The linear actuator assembly according to claim 4 further comprising at least one limit surface positioned to limit said movement of the buffer carriage along the actuator axis.

6. The linear actuator assembly according to claim 1 further comprising one or more deformable elements configured to be deformed during movement of the buffer carriage from the active configuration to the ora passive configuration.

7. The linear actuator assembly according to claim 6 wherein the linear actuator assembly comprises a plurality of deformable elements, and at least two of said deformable elements are configured to begin to be deformed at different points during the movement of the buffer carriage from the active configuration to the passive configuration.

8. The linear actuator assembly according to claim 6 wherein at least one of the one or more deformable elements is configured to undergo plastic deformation during said movement of the buffer carriage.

9. The linear actuator assembly according to claim 6 wherein at least one of the one or more deformable elements is configured to undergo shear deformation during said movement of the buffer carriage.

10. The linear actuator assembly according to claim 6 wherein at least one of the one or more deformable elements is configured to fracture during said movement of the buffer carriage.

11. The linear actuator assembly according to claim 1 wherein the buffer carriage is biased towards the active configuration.

12. The linear actuator assembly according to claim 1 wherein the buffer carriage is biased away from the active configuration.

13. The linear actuator assembly according to claim 1 wherein:
at least the rotary portion of the buffer cartridge is mounted on or within a support structure;
the support structure is axially and rotationally restrained relative to the one of the housing and the output shaft on which the buffer carriage is mounted; and
the buffer carriage is movable from the active configuration to the passive configuration by moving it relative to the support structure.

14. The linear actuator assembly according to claim 13, further comprising one or more deformable elements configured to be deformed during movement of the buffer carriage from the active configuration to the passive configuration, wherein at least one of the one or more deformable elements is received partially in a void in the support structure and partially in a void in the buffer carriage.

15. The linear actuator assembly according to claim 14 wherein at least one of the one or more deformable elements takes the form of a ring received in substantially annular voids in the support structure and buffer carriage.

16. The linear actuator assembly according to claim 14 wherein the at least one of the one or more deformable elements takes the form of a substantially prismic or cylindrical rod.

17. The linear actuator assembly according to claim 13 wherein:
one of the rotary portion and the support structure has a first interlocking portion, and the other has a second interlocking portion;
with the buffer carriage in the active configuration, the first and second interlocking portions are interlocked so as to rotationally couple the rotary portion and the support structure and thereby rotationally restrain the rotary portion;
with the buffer carriage in the passive configuration, the first and second interlocking portions are not interlocked and thus do not rotationally couple the rotary portion and the support structure, the rotary portion thereby being rotatable about the actuator axis.

18. The linear actuator assembly according to claim 17 wherein:
the first interlocking portion comprises a projection;
the second interlocking portion comprises an aperture which adjoins an annular void positioned substantially circumferentially about the actuator axis;
with the first and second interlocking portions interlocked the projection is received within the aperture, the walls of the aperture limiting the angular movement of the projection, thereby rotationally coupling the first and second interlocking portions and thus rotationally restraining the rotary portion; and with the buffer carriage in the passive configuration the projection is received within the annular void, the annular void acting as a circumferential runway for the projection and thereby allowing the rotary portion to rotate about the actuator axis.

19. The linear actuator assembly according to claim 13 wherein the support structure is a separate component to the one of the housing and the output shaft to which the buffer carriage is mounted, and is releasably attachable to said one of the housing and the output shaft via mutually complementary engagement features.

20. The linear actuator assembly according to claim 13, comprising a stroke-limiting assembly having a support structure and buffer carriage.

21. The linear actuator assembly according to claim 1, wherein the output shaft of the linear actuator is connected to a punch for driving a fastener or die, or effecting a clinching or friction stir spot welding operation.

* * * * *